(12) United States Patent
Lee et al.

(10) Patent No.: US 7,728,760 B2
(45) Date of Patent: Jun. 1, 2010

(54) METHOD FOR GENERATING A REPRESENTATION OF AN ATMOSPHERIC VORTEX KINEMATIC STRUCTURE

(75) Inventors: Wen-Chau Lee, Boulder, CO (US); Jong-Dao Jou, Taipei (TW)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 12/507,902

(22) Filed: Jul. 23, 2009

(65) Prior Publication Data

US 2010/0026565 A1  Feb. 4, 2010

Related U.S. Application Data

(60) Provisional application No. 61/084,718, filed on Jul. 30, 2008.

(51) Int. Cl.
  *G01S 13/95* (2006.01)
(52) U.S. Cl. ............... 342/26 R; 342/26 B; 342/26 D; 342/115; 342/195
(58) Field of Classification Search ............... 342/26 R, 342/26 A–26 D, 104, 115, 195
See application file for complete search history.

(56) References Cited

U.S. PATENT DOCUMENTS

| 3,646,555 | A | * | 2/1972 | Atlas | 342/26 R |
|---|---|---|---|---|---|
| 3,671,927 | A | * | 6/1972 | Proudian et al. | 367/94 |
| 3,735,333 | A | * | 5/1973 | Balser et al. | 367/105 |
| 4,712,108 | A | * | 12/1987 | Schwab | 342/26 D |
| 4,831,874 | A | * | 5/1989 | Daubin et al. | 73/489 |
| 5,534,868 | A | * | 7/1996 | Gjessing et al. | 342/26 D |
| 5,563,604 | A | * | 10/1996 | Brandao et al. | 342/159 |
| 6,307,500 | B1 | * | 10/2001 | Cornman et al. | 342/26 R |
| 6,480,142 | B1 | * | 11/2002 | Rubin | 342/26 R |

OTHER PUBLICATIONS

"Simulated WSR-88D Velocity and Reflectivity Signatures of Numerically Modeled Tornadoes", Vincent T Wood, Rodger A Brown, David C Dowell. Journal of Atmospheric and Oceanic Technology. Boston: May 2009. vol. 26, Iss. 5; p. 876 (16 pages).*

Bluestein, H.B., W.-C. Lee, M. Bell, C.C. Weiss, and A.L. Pazmany, 2003: Mobile Doppler Radar Obserations of a tornado in supercell near Bassett, Nebraska, on Jun. 5, 1999, Part II: Tornado-vortex structure. Mon.Wea. Rev., 131, 2968-2984.

(Continued)

*Primary Examiner*—John B Sotomayor
(74) *Attorney, Agent, or Firm*—The Ollila Law Group LLC

(57) ABSTRACT

A method for generating a representation of a kinematic structure of an atmospheric vortex is provided. The method comprises receiving a plurality of signals from a Doppler radar. The signals are reflected at a plurality of pulse volumes. The method also comprises measuring a plurality of Doppler velocities based on the received signals. A plurality of scaled Doppler velocities are calculated representing the plurality of measured Doppler velocities, the radial distance between the Doppler radar and the pulse volume where the Doppler velocity is measured, and the distance between the radar and a first estimated atmospheric vortex center. The method also comprises generating a representation of the kinematic structure of the atmospheric vortex using the plurality of scaled Doppler wind velocity values.

13 Claims, 17 Drawing Sheets

OTHER PUBLICATIONS

Brown, R.A., and V.T. Wood, 1991: On the interpretation of single-Doppler velocity patterns within severe thunderstorms. Wea. Forecasting. 6, 32-48.

Browing, K.A., and R. Wexler, 1968: The determination of kinematic properties of a wind field using Doppler radar, J. Appl. Meteor., 7, 105-113.

Donaldson, R.J., Jr., 1970: Vortex signature recognition by a Doppler radar. . Appl. Meteor., 9, 661-670—1991: A proposed technique for diagnosis by radar of hurricane signature. J. Appl. Meteor., 30, 1635-1645.

Harasti, P.R., 2003: The Hurricane volume velocity processing method., Preprints, $31^{st}$ Conf. on Radar Meteorology, Seattle, WA, Amer. Meteor, Soc., 1008-1011.

Harasti, P.R.,C.J. Mcadie, P. Dodge, W.-C. Lee, St.T. Murillo, and F.D. Marks Jr., 2004: Real-time implementation of single-Doppler radar analysis methods for tropical cyclones: Algorithm improvements and use with WSR-88D displaydata. Wea. Forecasting, 19, 219-239.

Jou, B.J.-D., S.-M.Deg, and B.-L. Chang, 1996: Determination of typhoon center and radius of maximum wind by using Doppler radar (in Chinese with English abstract) Atmos. Sci 24, 1-24.

Lee, W,-C., and F.D. Marks Jr., 2000: Tropical cyclone kinematic structure retrieved from single-Doppler radar observations. Part II: The GBVTD-simplex center finding algorithm. Mon. Wea. Re., 128, 1925-1936. and J.Wurman, 2005: Diagnosed three-dimensional axisymmetric structure of the Muihall Tornado on May 3, 1999. J. Atmos. Sci., 62, 2373-2393.

Lee, W.-C.and M.M. Bell, 2007: Rapid intensification, eyewall contraction, and breakdown of Hurricane Charley (2004) near landfall. Geophys. Res. Lett., 34, Lo2802, doi: 10.1029/2006GLo27889.

Lee, W.-C., F.D. Marks Jr., and R.E. Carbone, 1994: Velocity track display—A Technique to extract real-time tropical cyclone circulations using a single airborne Doppler radar. J. Atmos. Oceanic Technol. 11, 337-356.

Lee, W.-C., B.J.-D. Jou, P.-L, Chang, and S.M. Deng, 1999: Tropical cyclone kinematic structure retrieved from single-Doppler radar observations, Part I: Interpretation of Doppler velocity patterns and the GBVTD technique, Mon. Wea. Rev., 127, 2419-2439.

Lee, W.-C., B.J.-D. Jou, P.-L Chang and F.D.Marks Jr., 2000: Tropical cyclone kinematic structure retrieved from single-Doppler radar observations, Part III: Evolution and structures of Typhoon Alex (1987), Mon. Wea. Rev., 128, 3982-4001.

Liou, Y.C., T.-C. C. Wang, W.C. Lee, and Y.-J. Chang. 2006: The retrieval of asymmetric tropical cyclone structures using Doppler radar observations and the method of extended GBVTD. Mon. Wea. Rev., 134, 1140-1160.

Roux, F., F. Chane-Ming, A. Lasserre-Bigorry, and O. Nuissier, 2004: Sructure and evoloution of intense Tropical Cyclone Dina near La Reunion on Jan. 22, 2002: GB-EVTD analysis of single Doppler radar observations. J Atmos. Oceanic Technol. 21, 1501-1518.

Tanamachi, R.L., H.B. Bluestein, W.-C.Lee, M.Bell, and A. Pazmany, 2007: Ground-based velocity track display (GBVTD) analysis of W-band Dopplerradar data in a tornado near Stockton, Kansas, on May 15, 1999. Mon. Wea. Rev., 135, 783-800.

Wood,T.T., and R.A. Brown, 1992: Effects of radar proximity on single-Doppler velocity of axisymmetric rotation and divergence. Mon. Wea. Rev., 120, 2798-2807.

\* cited by examiner

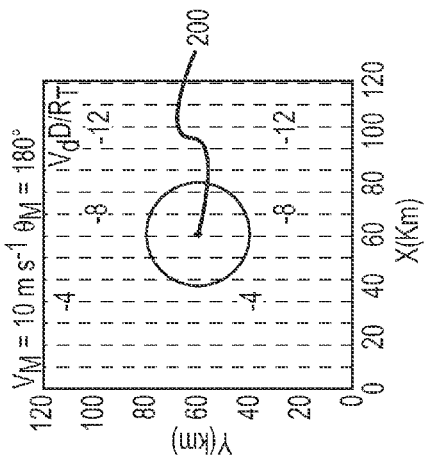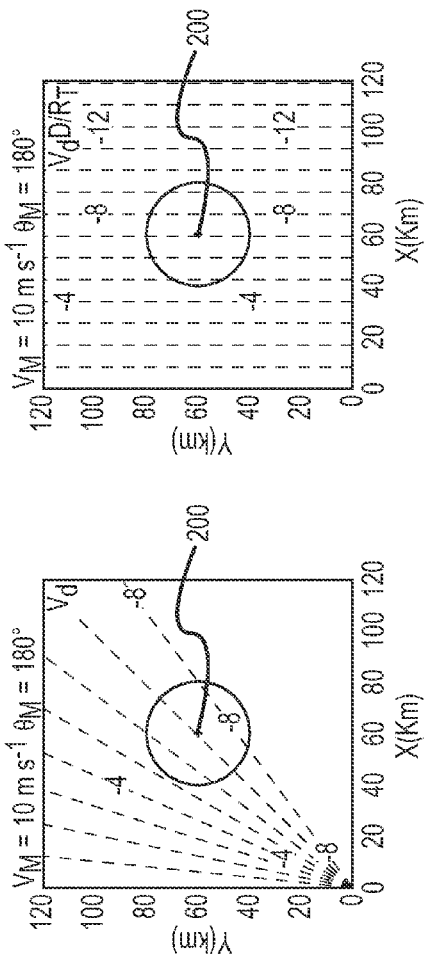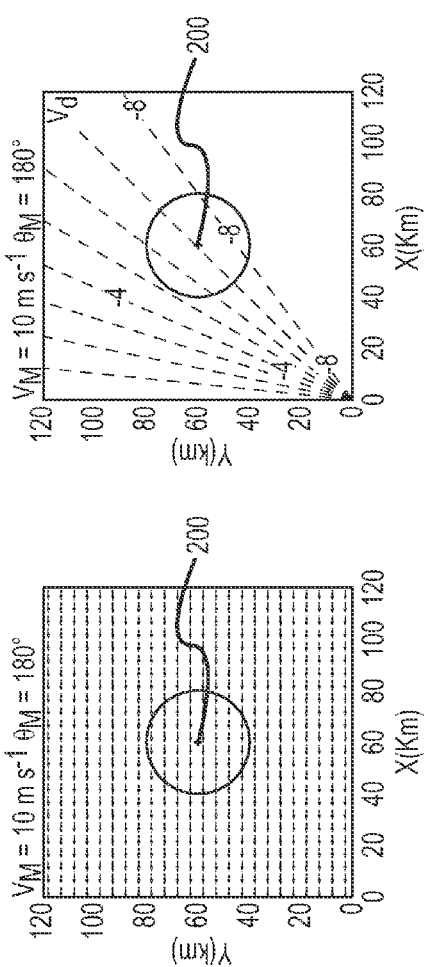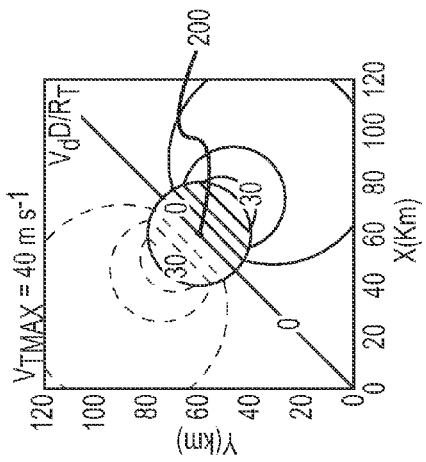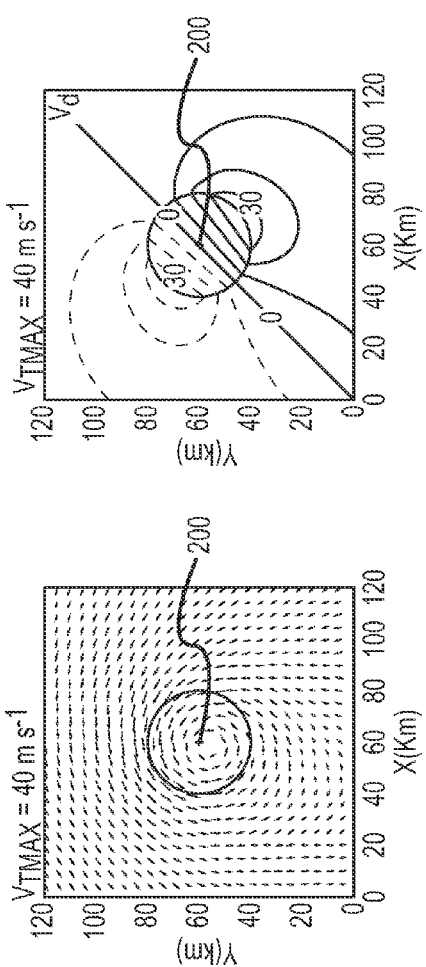
FIG.2A  FIG.2B  FIG.2C  FIG.2D  FIG.2E  FIG.2F

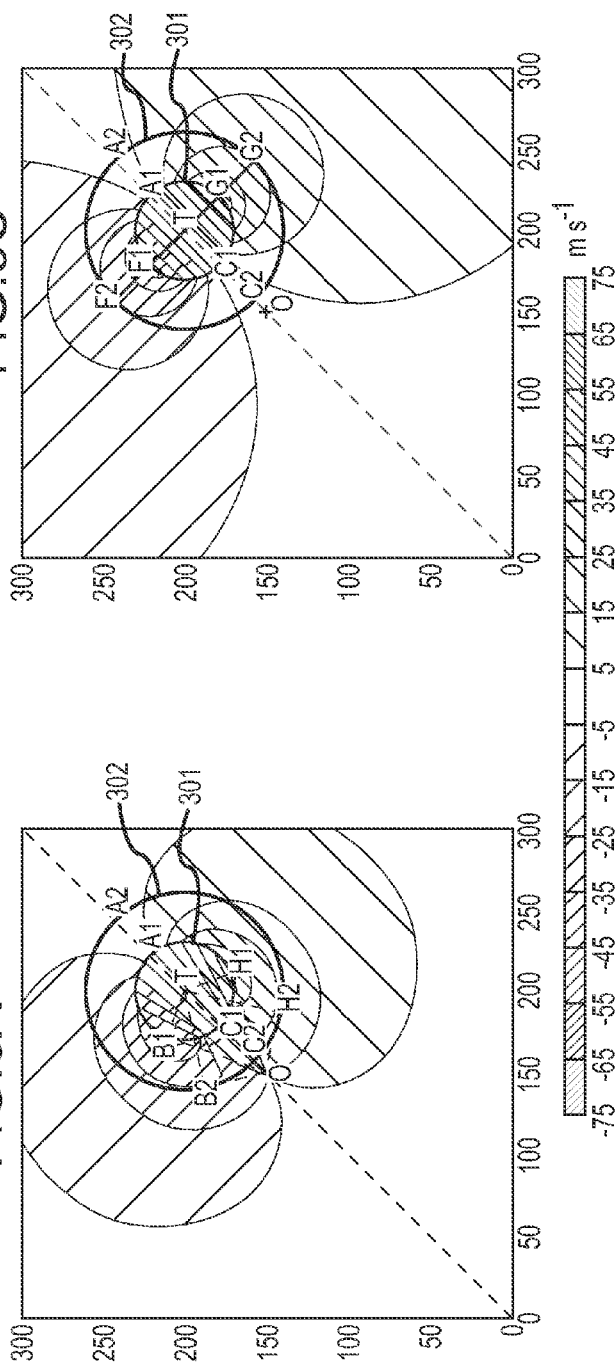
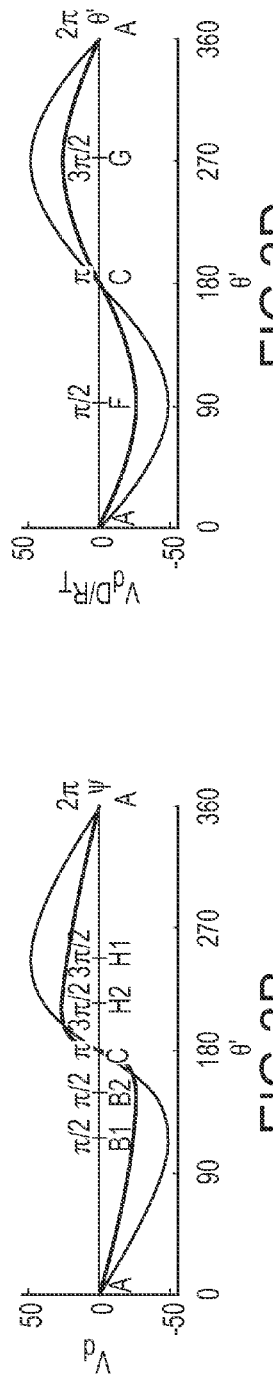

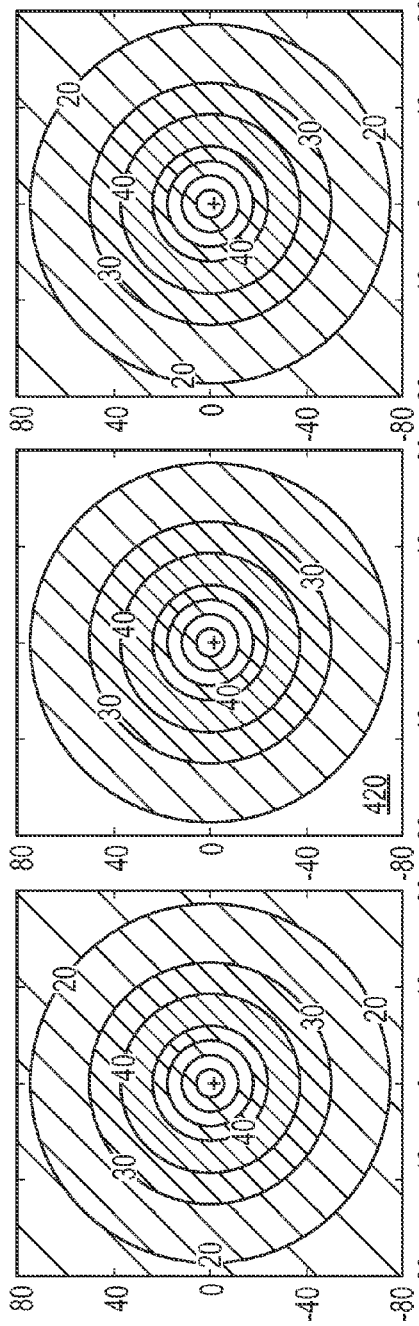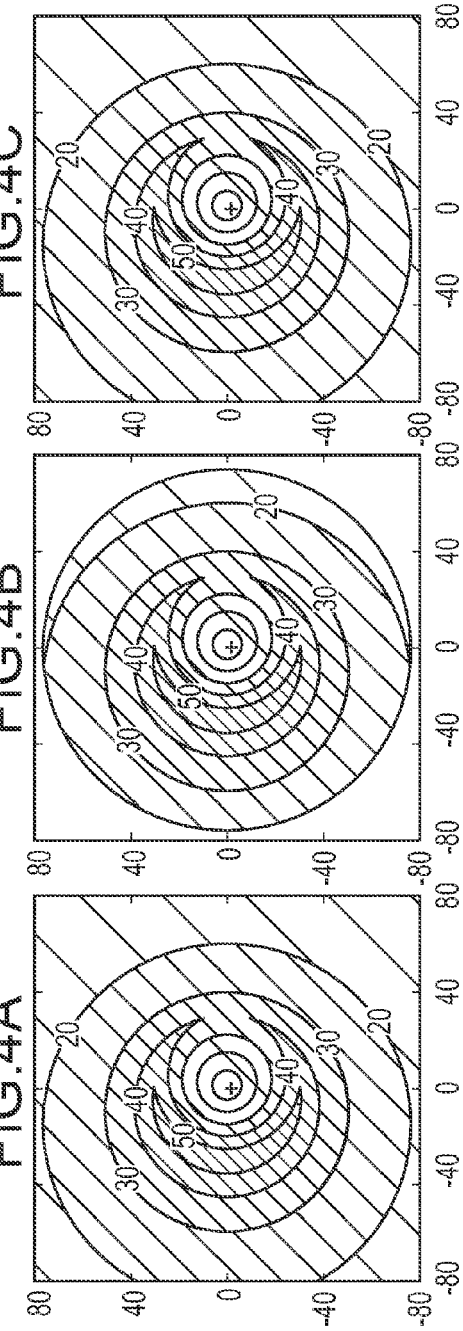

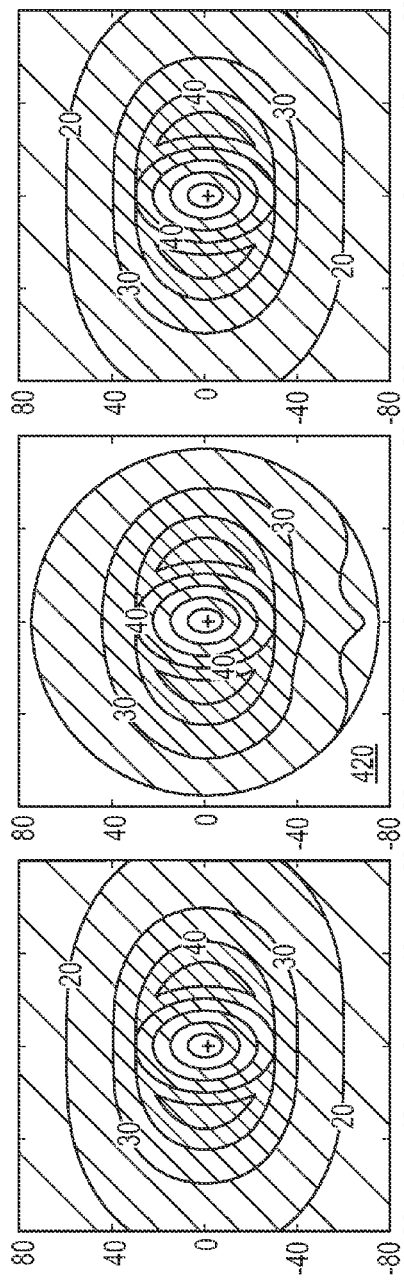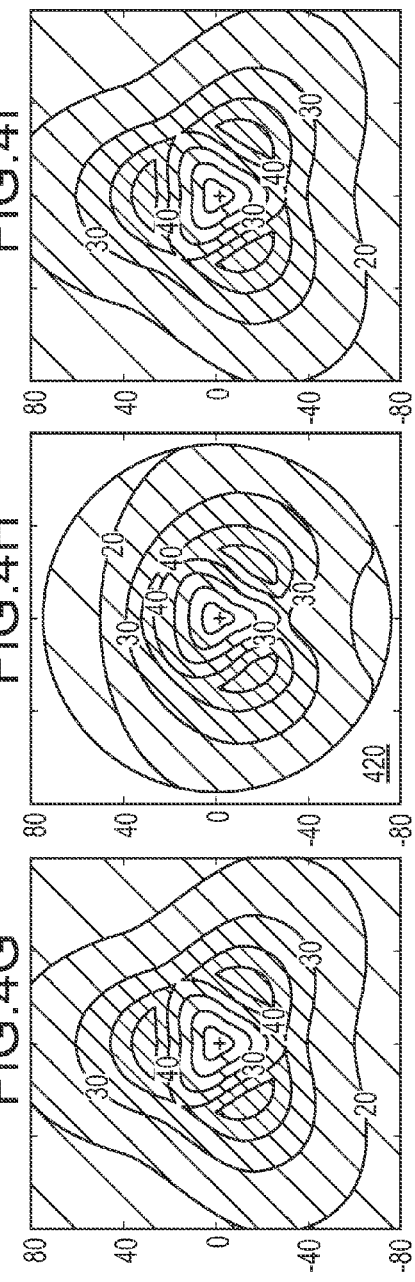

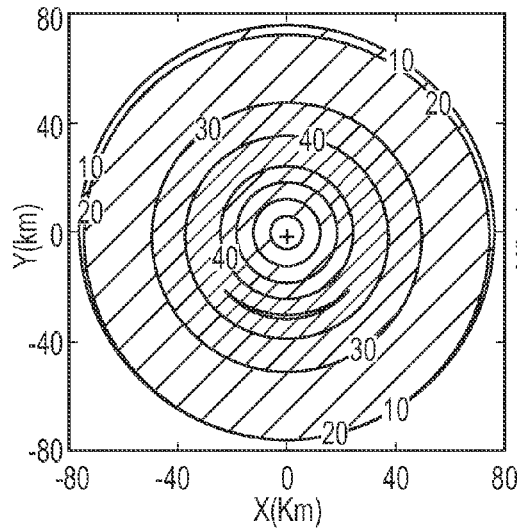
FIG.6A
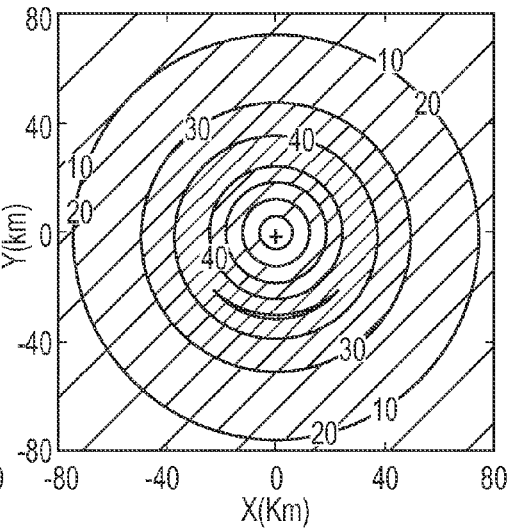
FIG.6B
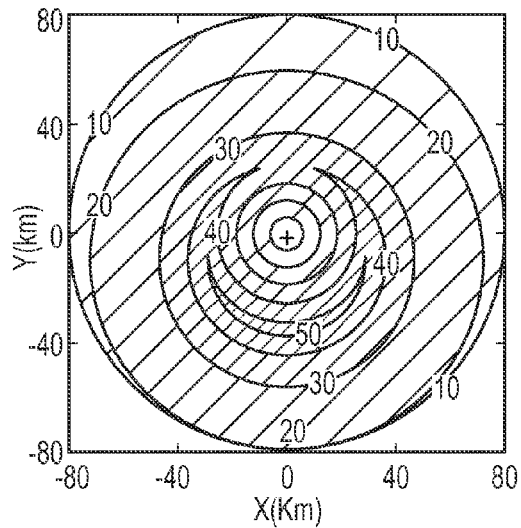
FIG.6C
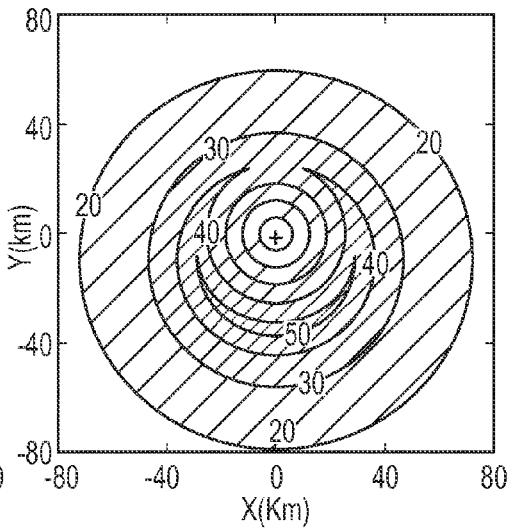
FIG.6D

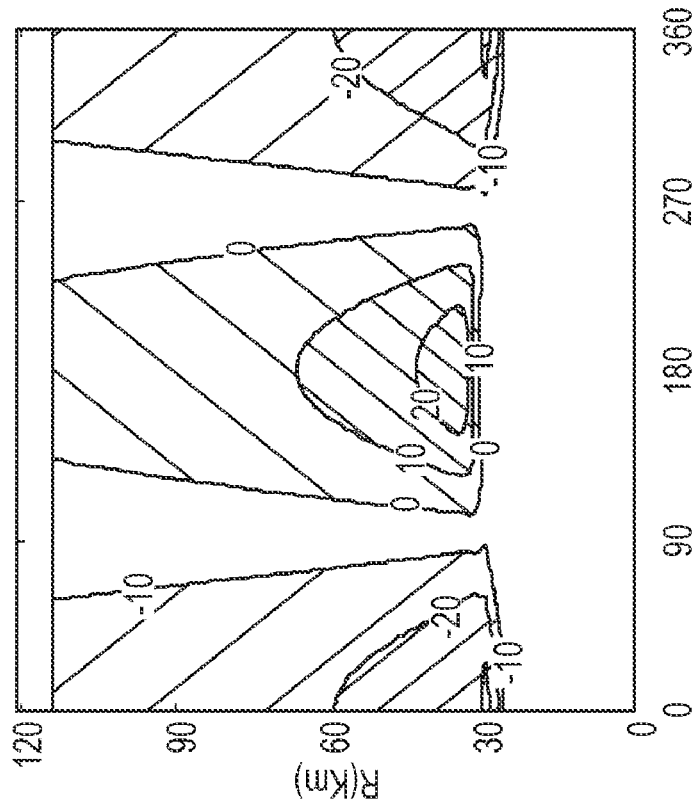
FIG. 7A
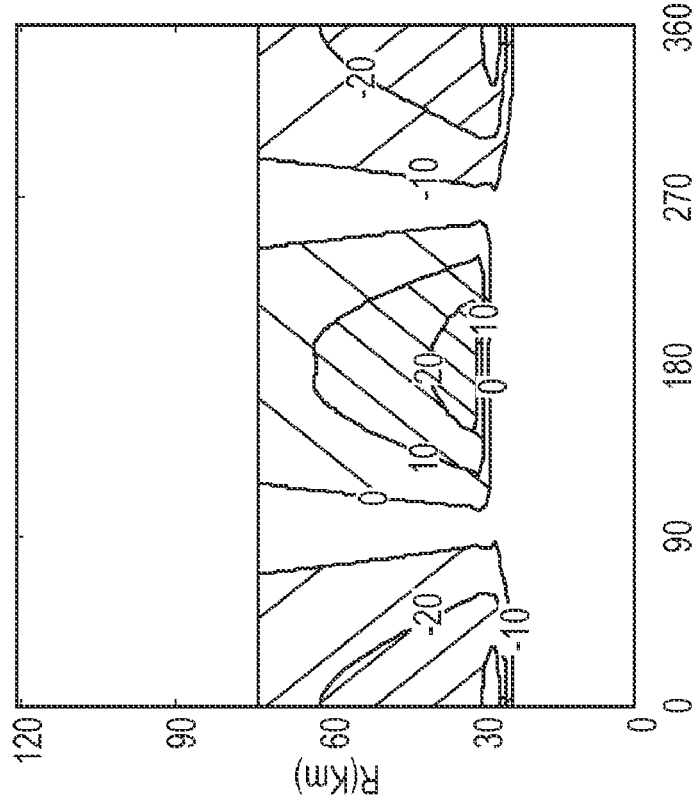
FIG. 7B
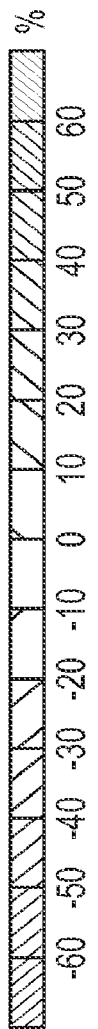

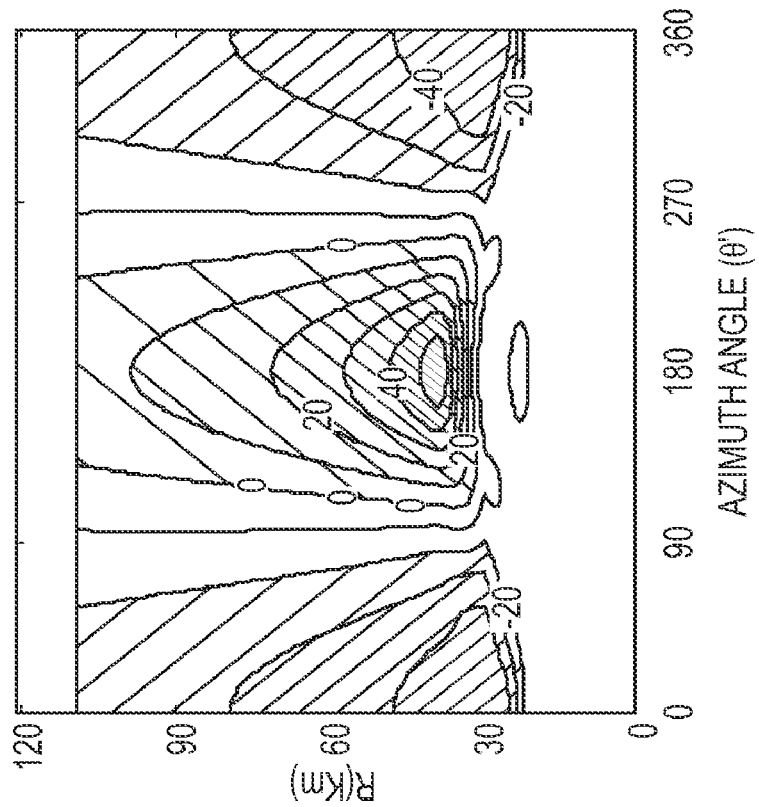
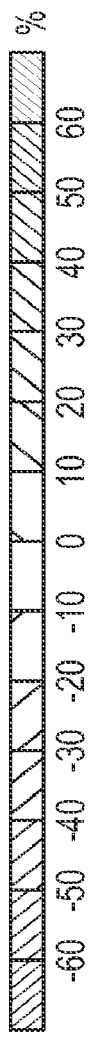
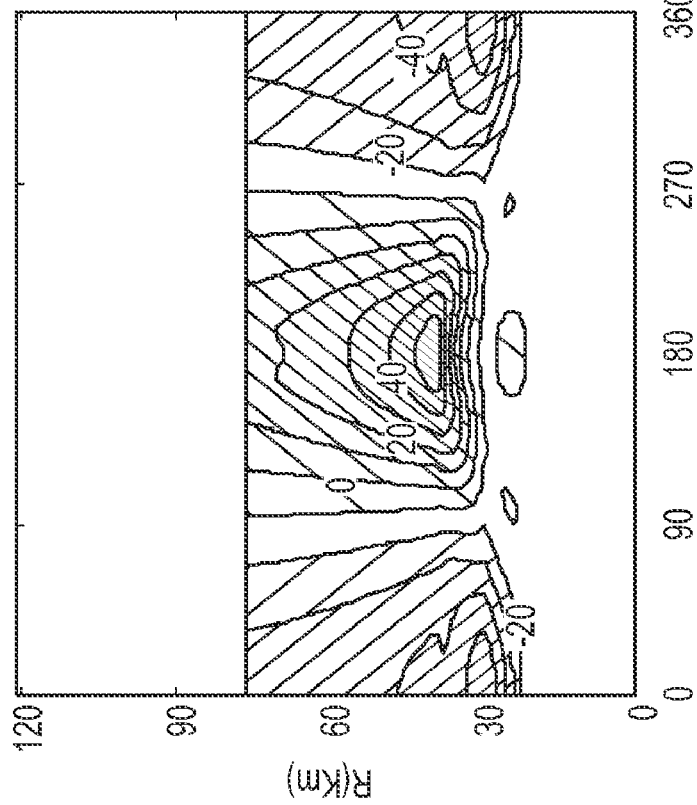

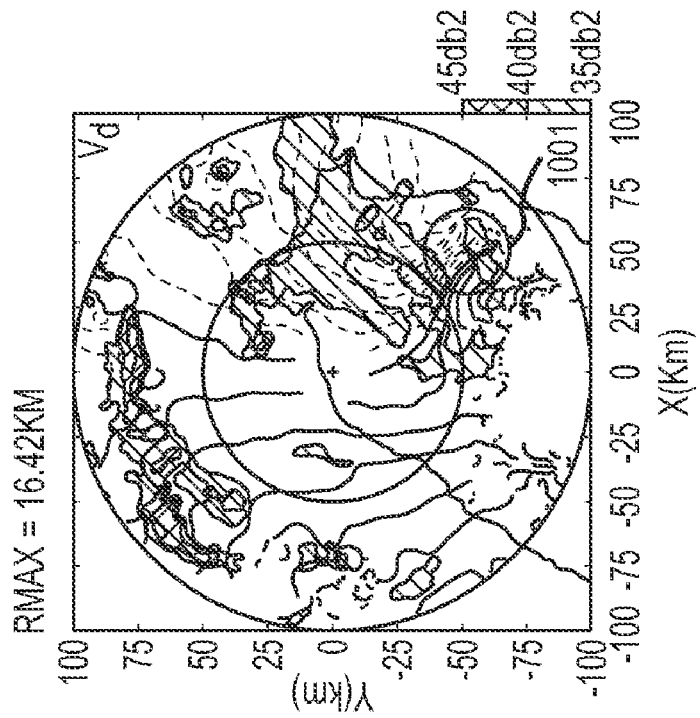
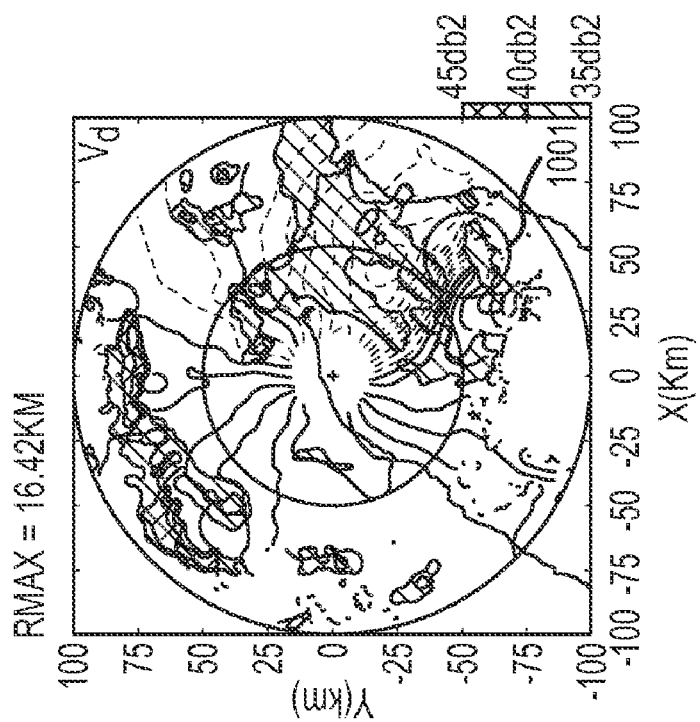

METHOD FOR GENERATING A REPRESENTATION OF AN ATMOSPHERIC VORTEX KINEMATIC STRUCTURE

CROSS-REFERENCE TO RELATED APPLICATION

This application claims priority from U.S. Provisional Patent Application No. 61/084,718, filed Jul. 30, 2008, entitled "Generalized VTD Retrieval of Atmospheric Vortex Kinematic Structure Part I: Formulation and Error Analysis", the contents of which are incorporated herein by reference.

GOVERNMENT LICENSE RIGHTS

This invention was made with Government support under ATM-0301213 awarded by the National Science Foundation. The Government has certain rights in this invention.

TECHNICAL FIELD

The present invention is directed towards velocity track display retrievals, and more particularly, to a velocity track display retrieval method that generates a representation of a kinematic structure of an atmospheric vortex structure based on a scaled Doppler velocity.

BACKGROUND OF THE INVENTION

Understanding the three-dimensional primary circulation of land-falling tropical cyclones (TCs) from single ground-based Doppler radar data has proved difficult despite numerous prior art approaches. A TC is typically described as a large cyclonic rotating body of winds characterized by a calm region near its circulation center. The intensity of a TC is usually classified by its surface maximum wind and/or minimum central pressure. Due to the practical limitations of dual-Doppler radar observations, prior art approaches have focused mainly on single-Doppler radar observations. One such approach is the so-called ground-based velocity track display (GBVTD) algorithm that attempts to estimate the primary circulation of atmospheric vortices, such as tropical cyclones and tornadoes. Although the GBVTD algorithm has greatly enhanced the estimation of the primary circulation of atmospheric vortices, the GBVTD algorithm has limitations in at least the following four areas: 1) distortion in the retrieved asymmetric wind fields, 2) a limited analysis domain, 3) the inability to resolve the cross-beam component of the mean wind, and 4) the inability to separate the asymmetric tangential and radial winds.

The present application overcomes some of these drawbacks and presents a new algorithm, which substantially eliminates the first two limitations inherent in the GBVTD technique and demonstrates the possibility of subjectively estimating the mean wind vector when its signature is visible beyond the influence of the vortex circulation.

According to an embodiment of the invention, the algorithm used by the present invention fits the atmospheric vortex circulation to a scaled Doppler velocity, $V_d D/R_T$, in a linear azimuth angle ($\theta'$), rather than the Doppler velocity $V_d$ in a nonlinear angle ($\psi$), which is used in GBVTD, where $V_d$ is the Doppler velocity, D is the radial distance between the radar and the pulse volume, and $R_T$ is the distance from the radar to the estimated vortex center. Key vortex kinematic structures (e.g., mean wind, axisymmetric tangential wind, etc.) in the $V_d D/R_T$ space simplify the interpretation of the radar signature and substantially eliminate the geometric distortion inherent in the $V_d$ display used in the prior art. This is a significant improvement in diagnosing vortex structures in both operations and research. The advantages of using $V_d D/R_T$ are illustrated using analytical atmospheric vortices, and the properties are compared with GBVTD. The characteristics of the $V_d D/R_T$ display of Typhoon Gladys (1994) were approximated by a constant mean wind plus an axisymmetric vortex to illustrate the usefulness of the present art.

Atmospheric vortices such as tropical cyclones and tornadoes possess a dipole Doppler velocity pattern when observed by a ground-based Doppler radar scanning in a plan-position indicator (PPI) mode. The shape of the dipole Doppler velocity pattern of an axisymmetric vortex is a function of the distance between the "vortex circulation center" (hereafter, the center) and the radar, the core diameter, and the ratio of peak tangential to peak radial wind. The dipole rotates clockwise (counterclockwise) when the radial wind is inflow (outflow). When an axisymmetric vortex is located at infinite distance from the radar, its center can be determined as the midpoint of the line segment connecting the two peak dipole velocities. As the vortex approaches the radar, the peak velocities of the dipole move toward the radar faster than the center. Hence, the dipole pattern is distorted and the center does not fall on the line segment connecting the two peak velocities of the dipole, which increases the complexity of accurately identifying the center in operational setting.

Based on the rotational characteristics of a vortex, a prior art, single-Doppler wind retrieval methodology, called the ground-based velocity track display (GBVTD), to retrieve and display the primary kinematic structures of atmospheric vortices has been developed. FIG. 1 shows the symbols and geometry of the GBVTD technique, which is also utilized according to the present invention. The symbols in FIG. 1 are defined as follows:

| | |
|---|---|
| O: | the location of the ground-based Doppler radar |
| T: | the center of the TC |
| R: | the radial distance from the TC center to the ring at a constant altitude where the analysis is performed |
| E: | the intersection of a radar beam and a constant radius ring |
| A, C: | the intersections of a radar beam and a ring of radius R |
| B, H: | the intersections of radar beams tangent to the ring of radius R where OB ⊥ TB and OH ⊥ TH |
| F, G: | FG passes through T and is perpendicular to OT |
| D: | the radial distance between the radar and a pulse volume |
| $R_T$: | the radial distance between the radar and the storm center |
| $\theta_D$: | the mathematical angle of the radar beam measured counterclockwise from the east |
| $\phi$: | the elevation angle of the radar beam |
| $V_d$: | the Doppler velocity |
| $V_T$: | the tangential velocity of the TC, positive counterclockwise (clockwise) in the Northern (Southern) Hemisphere |
| $V_R$: | the radial velocity of the TC, positive outward from the TC center |
| $V_M$: | the magnitude of the mean wind flow |
| $\theta_M$: | the direction of the mean wind flow |
| α: | the angle subtended by OE and OT (∠TOE) |
| $\alpha_{max}$: | the maximum α at a given radius (∠TOB) |
| ψ: | ∠OET; when ψ = 0 (A) and π (C), the radar beam is parallel to radius TE; when ψ = π/2 (B) and 3π/2 (D), the radar beam is normal to radius TE |
| $\theta_T$: | the mathematical angle for TC center viewing from the radar |

Using a cylindrical coordinate system with the center as the origin, the GBVTD technique performs a Fourier decomposition of the Doppler velocity $V_d$ around each circle of radius R, and then estimates the three-dimensional (3D) tangential and radial circulations that cannot be deduced by existing single-Doppler wind retrieval methods. Plausible axisymmetric 3D kinematic and dynamic quantities, such as the angular momentum, vertical vorticity, and perturbation pressure, can also be computed from the GBVTD-retrieved axisymmetric tangential and radial winds.

A few of the limitations of the GBVTD technique are as follows: 1) distortion in the retrieved asymmetric wind fields, 2) a limited analysis domain, 3) an inability to resolve the cross-beam component of the mean wind, and 4) an inability to separate the asymmetric tangential and radial winds. The first three limitations are caused by the sampling geometry, while the last is due to the intrinsic closure assumptions of the GBVTD technique. Hence, the GBVTD-derived vortex circulation is a proxy of the "true" circulation and may inherit large uncertainties resulting from the above limitations in certain situations.

The present application provides a generalized velocity track display (GVTD) technique and its applications to atmospheric vortices. The technique of the present invention extends the foundation of GBVTD already established in an attempt to address the first three aforementioned limitations inherent in the GBVTD technique. Starting from the same radar observations, the technique used by present invention introduces a new variable $V_d D/R_T$, which is the scaled Doppler velocity, by multiplying the radial distance between the radar and a pulse volume (D) by the measured Doppler velocity $V_d$, and then dividing by the distance between the radar and the estimated vortex center ($R_T$). Key vortex kinematic structures displayed in the $V_d D/R_T$ space simplify the interpretation of the radar signature and eliminate the geometric distortion inherited in the $V_d$ space. It will be shown that the present invention expands $V_d D/R_T$ into Fourier coefficients in a linear coordinate ($\theta'$) rather than expanding $V_d$ in a nonlinear coordinate ($\psi'$) in GBVTD. This results in a slightly complicated but mathematically exact representation, eliminating the required approximation of cos α in GBVTD. The present invention is able to retrieve asymmetric vortex structures without distortion when the center is known accurately.

SUMMARY OF THE INVENTION

A method for generating a representation of a kinematic structure of an atmospheric vortex is provided according to an embodiment of the invention. The method comprises receiving a plurality of signals from a Doppler radar. The signals are reflected at a plurality of pulse volumes. The method also comprises measuring a plurality of Doppler velocities based on the received signals. A plurality of scaled Doppler velocities are calculated representing the plurality of measured Doppler velocities, the radial distance between the Doppler radar and the pulse volume where the Doppler velocity is measured, and the distance between the radar and a first estimated atmospheric vortex center. The method also comprises generating a representation of the kinematic structure of the atmospheric vortex using the plurality of scaled Doppler wind velocity values.

A method for calculating a center of an atmospheric vortex is provided according to an embodiment of the invention. The method comprises receiving a plurality of signals from a Doppler radar. The signals are reflected at a plurality of pulse volumes. The method also comprises measuring a plurality of Doppler velocities based on the received signals. A plurality of scaled Doppler velocities are calculated representing the plurality of measured Doppler velocities, the radial distance between the Doppler radar and the pulse volume where the Doppler velocity is measured, and the distance between the radar and a first estimated atmospheric vortex center. The method also comprises calculating the center of the atmospheric vortex as the intersection of a line connecting two points where the measured Doppler velocity is substantially equal to zero and a line connecting two measured maximum scaled Doppler velocities.

Aspects

Preferably, the plurality of pulse volumes comprises a plurality of locations around one or more circles having different radii around the first estimated atmospheric vortex center.

Preferably, the method further comprises the step of locating a radius of maximum wind at a pulse volume having a maximum calculated scaled Doppler velocity.

Preferably, the method further comprises the step of calculating a second estimated atmospheric vortex center based on the intersection of a line connecting two points where the measured Doppler wind velocity is approximately zero and a line connecting two measured maximum scaled Doppler wind velocities.

Preferably, the method further comprises the step of calculating a mean wind vector based on the gradient of the measured Doppler velocity and the radial distance between the Doppler radar and a pulse volume where the Doppler velocity is measured.

Preferably, the scaled Doppler velocity values compensate for a distortion in the measured Doppler velocities as the atmospheric vortex approaches the Doppler radar.

Preferably, the method further comprises generating a display of the representation of the kinematic structure of the atmospheric vortex using the plurality of scaled Doppler wind velocity values.

Preferably, the method further comprises generating a display of the calculated center of the atmospheric vortex.

BRIEF DESCRIPTION OF THE DRAWINGS

FIG. 2a shows a display of a constant easterly mean wind with a magnitude of 10 m/s.

FIG. 2b shows the corresponding observed Doppler velocity of the mean wind of FIG. 2a.

FIG. 2c shows the corresponding observed $V_d D/R_T$ display of the mean wind of FIG. 2b.

FIG. 2d shows a Rankine-combined vortex.

FIG. 2e shows the corresponding observed Doppler velocity of the Rankine-combined vortex of FIG. 2d.

FIG. 2f shows the corresponding observed $V_d D/R_T$ display of the Rankine-combined vortex of FIG. 2d.

FIG. 3a shows a Doppler velocity display for a pure rotating vortex with $R_{max}$=30 km.

FIG. 3b shows the Doppler velocity profiles of FIG. 3a at R=30 km and R=60 km.

FIG. 3c shows the $V_d D/R_T$ display for a pure rotating vortex with $R_{max}$=30 km.

FIG. 3d shows the $V_d D/R_T$ profiles of FIG. 3c at R=30 km and R=60 km.

FIG. 4a shows a simulated axisymmetric wind field having wavenumber 0.

FIG. 4b shows the vortex structure of the wind field of FIG. 4a according to a prior art method.

FIG. 4c shows the vortex structure of the wind field of FIG. 4a according to the method of the present invention.

FIG. 4d shows a simulated axisymmetric wind field having wavenumber 1.

FIG. 4e shows the vortex structure of the wind field of FIG. 4d according to a prior art method.

FIG. 4f shows the vortex structure of the wind field of FIG. 4d according to the method of the present invention.

FIG. 4g shows a simulated axisymmetric wind field having wavenumber 2.

FIG. 4h shows the vortex structure of the wind field of FIG. 4g according to a prior art method.

FIG. 4i shows the vortex structure of the wind field of FIG. 4g according to the method of the present invention.

FIG. 4j shows a simulated axisymmetric wind field having wavenumber 3.

FIG. 4k shows the vortex structure of the wind field of FIG. 4j according to a prior art method.

FIG. 4k shows the vortex structure of the wind field of FIG. 4j according to the method of the present invention.

FIG. 6a shows a pure rotational vortex structure using the prior art approach for a center displacement of 1 km.

FIG. 6b shows a pure rotational vortex structure using the method according to the present invention for a center displacement 1 km.

FIG. 6c shows a pure rotational vortex structure using the prior art approach for a center displacement of 5 km.

FIG. 6d shows a pure rotational vortex structure using the method according to the present invention for a center displacement 5 km.

FIG. 7a shows the percentage error distribution of the vortex generated by a prior art approach as a function of θ' and R for a center displacement of 5 km.

FIG. 7b shows the percentage error distribution of the vortex generated by the method according to an embodiment of the invention as a function of θ' and R for a center displacement of 5 km.

FIG. 7c shows the percentage error distribution of the vortex generated by a prior art approach as a function of θ' and R for a center displacement of 10 km.

FIG. 7d shows the percentage error distribution of the vortex generated by the method according to an embodiment of the invention as a function of θ' and R for a center displacement of 10 km.

FIG. 10a shows the Doppler velocity CAPPI display of Typhoon Gladys at 4-km altitude.

FIG. 10b shows the $V_dD/R_T$ CAPPI display of Typhoon Gladys at 4-km altitude.

DETAILED DESCRIPTION OF THE INVENTION

FIGS. 1-10d and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

According to an embodiment of the invention, a method for determining asymmetric vortex structures is provided. A Doppler radar (not shown) positioned at O in FIG. 1 transmits a plurality of pulses towards a predefined volume of an atmospheric vortex, such as a tropical cyclone. It should be appreciated however, that the present invention should not be limited to tropical cyclones but rather is applicable to any type of atmospheric vortex. The signals transmitted from the Doppler radar are reflected back towards the radar at as is generally understood in the art. The radial wind velocity at the point of reflection distorts the signal resulting in a Doppler shift of the reflected signal. If the velocity of the wind is towards the radar, the Doppler shift results in an increase in the frequency of the received signal. Conversely, if the wind is away from the radar, the Doppler shift results in a decrease in the frequency of the received signal. If the wind velocity is perpendicular to the radar, the Doppler velocity will be substantially zero. Therefore, the Doppler radar only receives the radial component of the moving target (wind). Doppler radars are widely used in atmospheric research and the description of the Doppler signal is greatly simplified for the purpose of brevity. Therefore, it is appreciated that in actuality, the transmission and reception performed by the Doppler radar is much more complicated. In order to obtain sufficient information about the atmospheric vortex, data can be collected at a plurality of radii around the vortex center as is known in the art. A processor may be used to process the data received by the Doppler radar as is known in the art.

Figure 1:
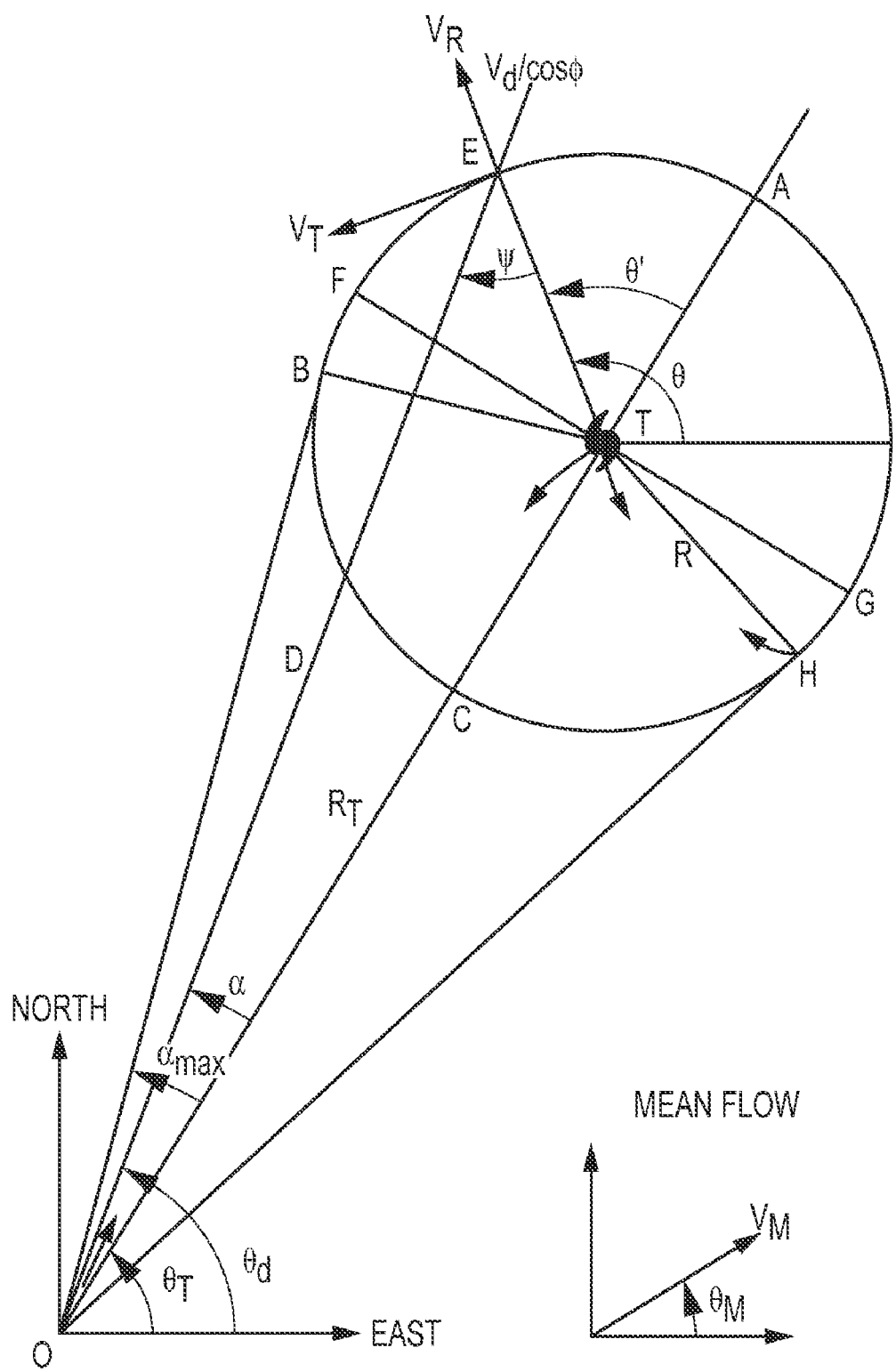
FIG. 1 shows the geometry and symbols utilized according to an embodiment of the invention.

Beginning with the geometry shown in FIG. 1, the horizontal projection of the Doppler velocity can be characterized as:

$$\hat{V}_d/\cos\phi = V_M \cos(\theta_d - \theta_M) - V_T \sin\phi + V_R \cos\phi \quad (1)$$

where φ is the elevation angle. Applying the relations shown in FIG. 1:

$\phi=\theta'-\alpha=\theta-\theta_T-\alpha=\theta-\theta_d$ results in equation (2).

$$\hat{V}_d / \cos\varphi = V_M \cos(\theta_d - \theta_M) - V_T \sin(\theta - \theta_d) + V_R \cos(\theta - \theta_d) \quad (2)$$
$$= V_M(\cos\theta_d \cos\theta_M + \sin\theta_d \sin\theta_M) -$$
$$V_T(\sin\theta\cos\theta_d) + V_R(\cos\theta\cos\theta_d + \sin\theta\sin\theta_d)$$

For a Doppler velocity at point E (D, $\theta_d$) in FIG. 1, the following is true:

$$D \cos\theta_d = R\cos\theta + R_T \cos\theta_T \quad (3)$$

$$D \sin\theta_d = R\sin\theta + R_T \sin\theta_T \quad (4)$$

Note that all angles are mathematical angles where positive is defined as being counterclockwise. Substituting (3) and (4) into (2) and approximating $V_d/\cos\phi$ with $V_d$, gives:

$$V_d = \frac{\begin{pmatrix} -V_T \sin\theta + \\ V_R \cos\theta + \\ V_M \cos\theta_M \end{pmatrix}\begin{pmatrix} R\cos\theta + \\ R_T \cos\theta_T \end{pmatrix}}{D} + \frac{\begin{pmatrix} V_T \cos\theta + \\ V_R \sin\theta + \\ V_M \sin\theta_M \end{pmatrix}\begin{pmatrix} R\sin\theta + \\ R_T \sin\theta_T \end{pmatrix}}{D} \quad (5)$$

Rearranging (5) and applying trigonometry identities, gives:

$$V_d \frac{D}{R_T} = -V_T \sin(\theta - \theta_T) + V_R\left[\frac{R}{R_T} + \cos(\theta - \theta_T)\right] + \quad (6)$$
$$V_M \cos(\theta_T - \theta_M) + \frac{R}{R_T} V_M \cos(\theta - \theta_M)$$

If $\theta'=\theta-\theta_T$ and $\theta-\theta_M=(\theta-\theta_T)+(\theta_T-\theta_M)$ then equation (6) becomes:

$$V_d \frac{D}{R_T} = V_R \frac{R}{R_T} + V_M \cos(\theta_T - \theta_M) - \left[V_T + \left(\frac{R}{R_T}\right)V_M \sin(\theta_T - \theta_M)\right] \quad (7)$$
$$\sin\theta' + \left[V_R + \frac{R}{R_T} V_M \cos(\theta_T - \theta_M)\right]\cos\theta'$$

For a given R, the right-hand-side of (7) depends only on $\theta'$. It can be seen that $V_d$, a function of nonlinear $\phi$ in the prior art approach, GBVTD, corresponds to $V_d D/R_T$, a function of linear $\theta'$ in the present invention. Note that GBVTD required an approximation to link the unknown variable $\sin\alpha$ and the known constant $\sin\alpha_{max}$, $=R/R_T$. Therefore, when $R>R_T$, $\alpha_{max}$ was not defined (see FIG. 1) in the prior art GBVTD approach. It should be appreciated that this restriction does not really exist according to the present invention because $R/R_T$ is used instead of $\sin\alpha_{max}$, however, it can be shown that when $R/R_T>1$, $\phi$ spans an insufficient and highly nonlinearly spaced subset of 0-$2\pi$ for a meaningful GBVTD fit. Explicitly moving D to the left-hand side as part of the new variable according to the invention makes (7) mathematically exact and valid for all radii beyond $R>R_T$.

According to an embodiment of the invention, $V_d D/R_T$, $V_T$, and $V_R$ can be decomposed into Fourier components in the $\theta'$ coordinates giving:

$$V_d \frac{D}{R_T}(R, \theta') = A_0 + \sum_1^N A_n \cos n\theta' + \sum_1^N B_n \sin n\theta' \quad (8)$$

$$V_T(R, \theta') = V_T C_0 + \sum_1^N V_T C_n \cos n\theta' + \sum_1^N V_T S_n \sin n\theta' \quad (9)$$

$$V_R(R, \theta') = V_R C_0 + \sum_1^N V_R C_n \cos n\theta' + \sum_1^N V_R S_n \sin n\theta' \quad (10)$$

where $A_n$ ($V_T C_n$ and $V_R C_n$) and $B_n$ ($V_T S_n$ and $V_R S_n$) are the azimuthal wavenumber n cosine and sine components of $V_d D/R_T$ ($V_T$ and $V_R$), then substituting (8), (9), and (10) into (7), gives the following:

$$A_0 = \frac{R}{R_T} V_R C_0 + V_M \cos(\theta_T - \theta_M) - \frac{1}{2} V_T S_1 + \frac{1}{2} V_R C_1 \quad (11)$$

$$A_1 = \frac{R}{R_T} V_R C_1 + \frac{R}{R_T} V_M \cos(\theta_T - \theta_M) + V_R C_0 - \frac{1}{2} V_T S_2 + \frac{1}{2} V_R C_2 \quad (12)$$

$$B_1 = \frac{R}{R_T} V_R S_1 - \frac{R}{R_T} V_M \sin(\theta_T - \theta_M) - V_T C_0 + \frac{1}{2} V_T C_2 + \frac{1}{2} V_R S_2 \quad (13)$$

$$A_n(n \geq 2) = \frac{R}{R_T} V_R C_n + \frac{1}{2}(V_T S_{n-1} + V_R C_{n-1} - V_T S_{n+1} + V_R C_{n+1}) \quad (14)$$

$$B_n(n \geq 2) = \frac{R}{R_T} V_R S_n + \frac{1}{2}(-V_T C_{n-1} + V_R S_{n-1} + V_T C_{n+1} + V_R S_{n+1}) \quad (15)$$

Rearranging (11)-(15) to express each wave component of the vortex using these Fourier coefficients gives:

$$V_M \cos(\theta_T - \theta_M) = A_0 - \frac{R}{R_T} V_R C_0 + \frac{1}{2} V_T S_1 - \frac{1}{2} V_R C_1 \quad (16)$$

$$V_T C_0 = -B_1 - B_3 + \frac{R}{R_T}\left[\begin{matrix} -V_M \sin(\theta_T - \theta_M) + \\ V_R S_1 + V_R S_3 \end{matrix}\right] + V_R S_2 \quad (17)$$

$$V_R C_0 = \frac{A_0 + A_1 + A_2 + A_3 + A_4}{1 + \frac{R}{R_T}} - V_M \sin(\theta_T - \theta_M) - V_R C_1 - V_R C_2 - V_R C_3 \quad (18)$$

$$V_T S_n = 2A_{n+1} - V_R C_n + V_T S_{n+2} - V_R C_{n+2} - 2\frac{R}{R_T} V_R C_{n+1} \quad (19)$$

$$V_T C_n = -2B_{n+1} + V_R S_n + V_T C_{n+2} + V_R S_{n+2} + 2\frac{R}{R_T} V_R S_{n+1} \quad (20)$$

Equations (16)-(20) correspond to similar equations for the prior art GBVTD technique with additional terms associated with $R/R_T$. In the limit of $R/R_T\sim 0$, these two sets of equations are identical when they are truncated at the same wavenumber n. It can be shown that (6) reduces to VTD in the limit of $R/R_T\sim 0$ (i.e., $D/R_T\sim 1$). Assuming the flight track in VTD is oriented in the east-west direction, it is equivalent to have $\theta_T=\pi/2$ in the geometry shown in FIG. 1. The azimuth angle $\theta$ in VTD ($\theta^{VTD}$) and $\theta$ in the present invention ($\theta^{PI}$) results in $\theta^{VTD}=\theta^{PI}-\pi$. In addition, positive $V_d$ in VTD ($V_d^{VTD}$) corresponds to positive $V_T$ and $V_R$ of a vortex, while the opposite is true for $V_d$ in the present invention ($V_d^{PI}$). In the limit of $R/R_T\sim 0$, replacing $\theta$ with $\theta^{PI}$ and $\theta_T-\theta_M$ with $\pi/2-\theta_M^{PI}$, (6) becomes:

$$V_d^{PI} = V_M \cos\left(\frac{\pi}{2} - \theta_M^{PI}\right) - V_T \sin\left(\theta^{PI} - \frac{\pi}{2}\right) + V_R \cos\left(\theta^{PI} - \frac{\pi}{2}\right) \quad (21)$$

$$= V_M \cos\left(\frac{\pi}{2} - \theta_M^{VTD} - \pi\right) - V_T \sin\left(\theta^{VTD} + \pi - \frac{\pi}{2}\right) +$$

$$V_R \cos\left(\theta^{VTD} + \pi - \frac{\pi}{2}\right)$$

$$= -V_M \sin\theta_M^{VTD} - V_T \cos\theta^{VTD} - V_R \sin\theta^{VTD}$$

$$= -V_d^{VTD}$$

Equation 21 proves that the present invention reduces to VTD in the limit of $R/R_T \sim 0$.

In this situation, all radar beams of ground-based radar can be treated parallel with each other, similar to the sampling geometry in VTD. In addition, the most severe geometric constraint imposed in GBVTD, that is, the analysis domain of a storm is limited to $R/R_T < 1$, is no longer a constraint. The analysis domain in the present invention extends over the entire domain wherever sufficient Doppler velocity data are available to yield reliable Fourier coefficient estimates for the present invention. This point is illustrated in more detail below. Therefore, the present invention provides a more general form of the VTD family of techniques.

The present invention faces similar limitations encountered in GBVTD where the numbers of unknown variables are greater than the number of equations. According to an embodiment of the invention, the same closure assumptions as GBVTD can be assumed, namely, that the asymmetric $V_R$ is smaller than $V_T$ and therefore can be ignored.

The characteristics of vortex signatures in $V_d D/R_T$ space can be evaluated analytically from (7). Because (7) is similar to the VTD, which is generally known in the art, characteristics of $V_d D/R_T$ resemble those of $V_d$ in VTD where radar beams are parallel to each other and there is no geometric distortion of the asymmetric structures.

Regrouping (7) yields:

$$\frac{V_d D}{R_T} = -U_1 \sin(\theta' - \theta_0) + U_2 \quad (22)$$

where:

$$U_1 = \left\{ \begin{array}{l} \left[V_T + \left(\frac{R}{R_T}\right)V_M \sin(\theta_T - \theta_M)\right]^2 + \\ \left[V_R + \left(\frac{R}{R_T}\right)V_M \cos(\theta_T - \theta_M)\right]^2 \end{array} \right\}^{1/2} \quad (23)$$

$$U_2 = V_R + \frac{R}{R_T} + V_M \cos(\theta_T - \theta_M) \quad (24)$$

$$\theta_0 = \tan^{-1} \frac{V_R + \frac{R}{R_T} V_M \cos(\theta_T - \theta_M)}{V_T + \frac{R}{R_T} V_M \sin(\theta_T - \theta_M)} \quad (25)$$

It can be concluded that for a fixed R, (22) is a function of $\theta'$ only as long as $V_M$, $V_T$, and $V_R$ are functions of $\theta'$. The existence of $V_R$ and/or $V_M$ in (24) raises or lowers the entire sine curve. Note that in VTD and GBVTD, $V_M$ is the only factor that would shift the entire curve up and down for axisymmetric vortices. In (25), $\theta_0$ represents the phase shift of the sine curve (i.e., azimuthal rotation of the dipole). If there is no mean wind ($V_M=0$), then $\theta_0$ reduces to $\tan^{-1}(V_R/V_T)$, as in GBVTD. The effect of $V_M$ on $\theta_0$ is further reduced by the factor $R/R_T$ in the near-core region, but this effect may not be ignored at far radii of the vortex. If $V_T \gg V_R$, then $\theta_0 \sim 0$. Thus, in a vortex without significant $V_R$, $\theta_0$ is generally small. Note that the phase shift of the dipole signature does not depend on $V_M$ in $V_d$ space, but does depend on $V_M$ in $V_d D/R_T$ space according to the present invention. This has the effect of complicating the estimation of the axisymmetric radial wind. The mean wind vector can be estimated by using the hurricane volume velocity processing (HVVP) method, which is generally known in the art, or using the unique signature of the mean wind in the $V_d D/R_T$ display (shown below).

An idealized vortex flow field was constructed to simulate the wind patterns using $V_d$ and $V_d D/R_T$. The complete flow fields include a uniform mean wind, an axisymmetric $V_T$, and an axisymmetric $V_R$. The mathematical expressions in natural coordinates are:

$$V_M = -V_M \sin(\theta - \theta_M)\hat{t} + V_M \cos(\theta - \theta_M)\hat{r} \quad (26)$$

$$V_T = V_{T_{max}} \left(\frac{R}{R_{max}}\right)^{\lambda_t} \hat{t} \quad (27)$$

$$V_R = V_{R_{max}} \left(\frac{R}{R_{max}}\right)^{\lambda_r} \hat{r} \quad (28)$$

Where t is the unit vector in the tangential direction (positive counterclockwise) and r is the unit vector in the radial direction (positive toward center); $V_{Tmax}$ ($V_{Rmax}$) is the maximum axisymmetric $V_T$ ($V_R$).

FIGS. 2a-2l shows a set of the flow fields, in which 200 marks the center of the vortex at (x, y)=(60 km, 60 km), $V_{Tmax}=40$ m s$^{-1}$, $V_{Rmax}=10$ m s$^{-1}$, $V_M=10$ m s$^{-1}$, $\theta_M=180°$, and $R_{max}=20$ km. For a Rankine vortex, we have $\lambda_t=\lambda_r=1$ when $R \leq R_{max}$, and $\lambda_t=\lambda_r=-1$ when $R>R_{max}$. The hypothetical Doppler radar is located at the origin.

Figure 2I:
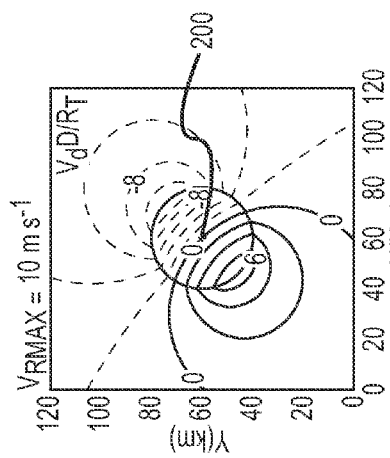
FIG. 2i shows the corresponding observed $V_d D/R_T$ display of the axisymmetric radial wind of FIG. 2g.

A constant easterly mean wind is shown in FIG. 2a and its corresponding $V_d$ and $V_d D/R_T$ displays are illustrated in FIGS. 2b & 2c. It should be appreciated that in generating the vortex structures displayed in FIGS. 2a-2l, the Doppler radar transmits a plurality of radar signals, which are reflected back towards the radar at given points in space. The radial component of the wind velocity at the reflected point generates a Doppler shift in the transmitted signal resulting in the calculated Doppler velocity $V_d$. Those skilled in the art will appreciate that data is collected at a plurality of locations (pulse volumes) at various radii around the center of the atmospheric vortex.

The mean wind signature is a set of straight lines diverging from the radar in the $V_d$ display (FIG. 2b). The wind direction is perpendicular to the zero Doppler velocity line pointing toward the positive contours and the wind speed is the maximum Doppler velocity in the domain. In the $V_d D/R_T$ display according to an embodiment of the invention, the easterly mean wind signature is a set of north-south-oriented parallel lines (FIG. 2c). It can be shown that the mean wind vector is the gradient of $V_d D$.

Starting from (5), moving D to the left-hand side, and considering a uniform mean wind only, gives:

$$V_d D = V_M \cos\theta_M (R\cos\theta + R_T \cos\theta_T) + \quad (29)$$

$$V_M \sin\theta_M (R\sin\theta + R_T \sin\theta_T)$$

$$= V_M \cos\theta_M (x' + x_T) + V_M \sin\theta_M (y' + y_T)$$

-continued $$= V_M(x\cos\theta_M + y\sin\theta_M)$$

where: $x_T=R_T \cos \theta_T$, $y_T=R_T \sin \theta_T$, $x'=R \cos \theta$, and $y'=R \sin \theta$. The origin of the Cartesian coordinate (x,y) is located at the radar. This equation is in the form of a straight line, ax+by=c, because $V_M$ and $\theta_T$ are constant for a uniform mean wind. Taking the gradient of (29) gives:

$$\nabla(V_d D) = \left[\frac{\partial}{\partial x}(V_d D) + \frac{\partial}{\partial y}(V_d D)\right] \qquad (30)$$

$$= (V_M \cos\theta_M, V_M \sin\theta_M)$$

Therefore, the direction of the gradient vector is $\theta_M$ while the magnitude of the gradient vector is $V_M$. It should be appreciated that (30) is independent of $R_T$ and is expressed in a Cartesian coordinate system. As a result, estimating the mean wind vector using $V_d D$ can be applied to any flow field, and is not limited to atmospheric vortices.

This parallel line signature can be identified by visually examining the $V_d D/R_T$ contours not affected by the vortex circulation, usually in the quadrant opposite the center. Hence, one of the unresolved quantities in the GBVTD formulation, the cross-beam mean wind, can be directly estimated in the $V_d D/R_T$ display.

The flow fields $V_d$ and $V_d D/R_T$ displays of an axisymmetric vortex are portrayed in FIGS. 2d-f. The striking differences between the $V_d$ and $V_d D/R_T$ displays (FIGS. 2e,f) are in the shapes of the contours. The $V_d$ pattern of an axisymmetric tangential vortex (FIG. 2e) is distorted as a function proportional to $R/R_T$. On the contrary, the $V_d D/R_T$ contours are symmetric about the center (FIG. 2f), independent of $R/R_T$ with no distortion. The midpoint of the line connecting the dipole in the $V_d D/R_T$ display can be used to estimate the center and the radius of maximum wind (RMW or $R_{max}$).

Figure 2H:
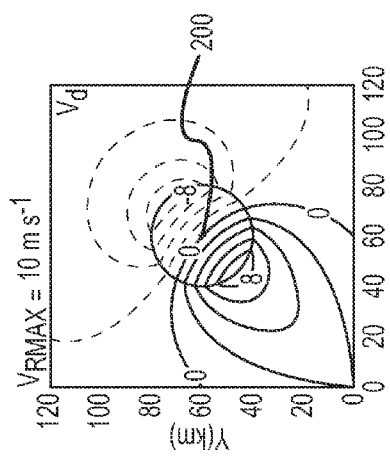
FIG. 2h shows the corresponding observed Doppler velocity of the axisymmetric radial wind of FIG. 2g.
Figure 2G:
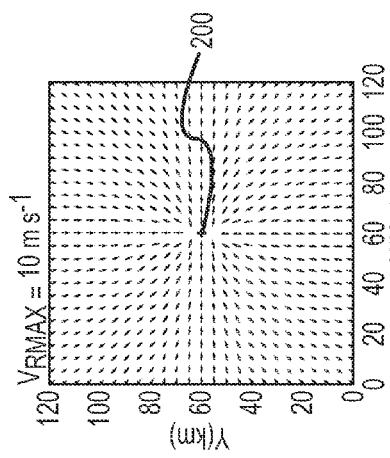
FIG. 2g shows an axisymmetric radial wind.

Examples of the axisymmetric radial outflow are illustrated in FIGS. 2g-i. When considering $V_T=0$, $V_M=0$ in (26-28), $U_1=V_R$, $U_2=V_R(R/R_T)$, and $\theta_0=\pi/2$ or $3\pi/2$, (22) becomes $V_d D/R_T=-V_R \sin(\theta'-\pi/2)+V_R R/R_T$. This is the reason why the $V_R$ signature in the $V_d D/R_T$ display is not symmetric about the center and there is a $\pi/2$ phase difference between $V_R$ and $V_T$ in $V_d D/R_T$ displays. Nevertheless, the contours are more symmetric in the $V_d D/R_T$ display compared with the $V_d$ display.

Figure 2L:
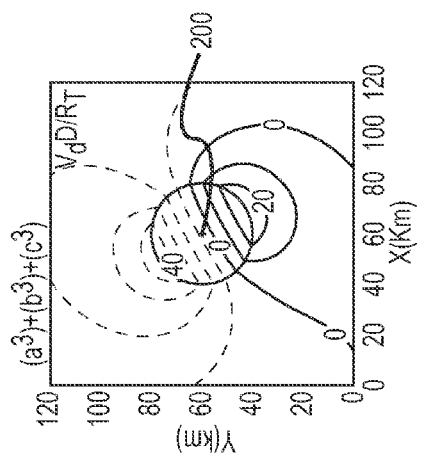
FIG. 2l shows the observed $V_d D/R_T$ display of the total wind of FIG. 2j.
Figure 2K:
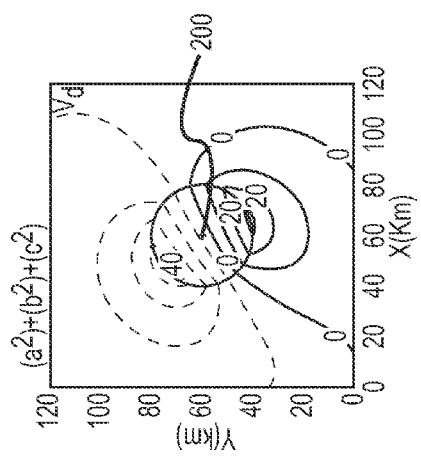
FIG. 2k shows the observed Doppler velocity of the total wind of FIG. 2j.
Figure 2J:
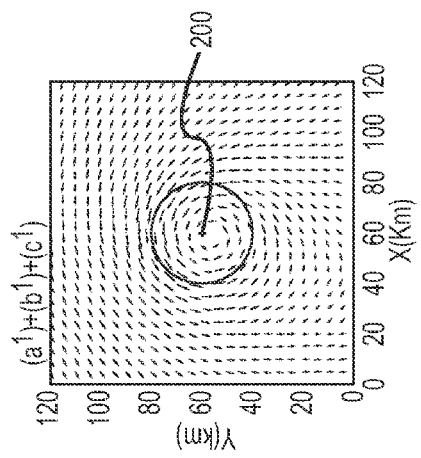
FIG. 2j shows the total wind of FIGS. 2a, 2d, and 2g.

FIGS. 2j-l illustrate the flow field of a combination of $V_M$, $V_T$, and $V_R$, and the corresponding $V_d$ and $V_d D/R_T$ displays. The combined flow field is asymmetric. However, the dipole is not significantly distorted in the $V_d D/R_T$ display near $R_{max}$, even with the addition of a constant $V_M$ and axisymmetric $V_R$, allowing the center and RMW to be estimated using the VDAD (Velocity Distance Azimuth Display) method (FIG. 2l).

To further examine the characteristics of vortex signatures in the $V_d$ and $V_d D/R_T$ displays as a function of $R_{max}$, two axisymmetric rotating vortices with $V_{Tmax}=50$ m s$^{-1}$ and an $R_{max}$ of 30 and 80 km were constructed, and their corresponding $V_d$ and $V_d D/R_T$ displays are shown in FIG. 3.

FIG. 3(a & c) illustrate the $V_d$ and $V_d D/R_T$ displays of the smaller vortex with an $R_{max}$ of 30 km where the radar is located outside the RMW, while FIG. 3(b & d) portray the corresponding profiles of $V_d$ and $V_d D/R_T$ around two radii 301, 302 (at R=30 and 60 km). As R increases, the peak wind locations in the $V_d$ display ($\psi=\pi/2$ and $3\pi/2$ in FIG. 3b) shift toward $\psi=\theta'=\pi$, while the peak values of $V_d D/R_T$ (FIG. 3d) remain at $\theta'=\pi/2$ and $\theta'=3\pi/2$. In the $V_d D/R_T$ display, the center remains at the intersection between the zero Doppler velocity line and the line connecting the dipole (peak values of $V_d D/R_T$), independent of the geometric factor $R/R_T$. This is because by scaling $V_d$ and displaying the atmospheric vortex using $V_d D/R_T$, all of the radar beams are displayed parallel to the radar.

Figure 3G:
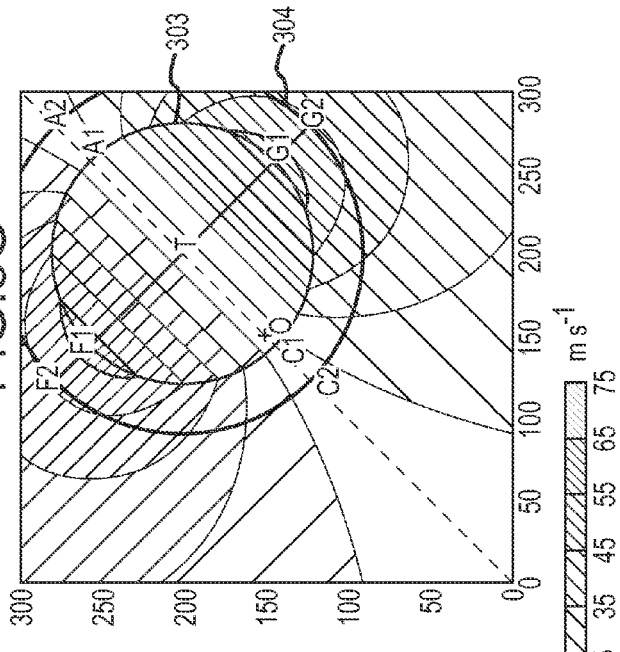
FIG. 3g shows the $V_dD/R_T$ display for a pure rotating vortex with $R_{max}$=80 km.
Figure 3E:
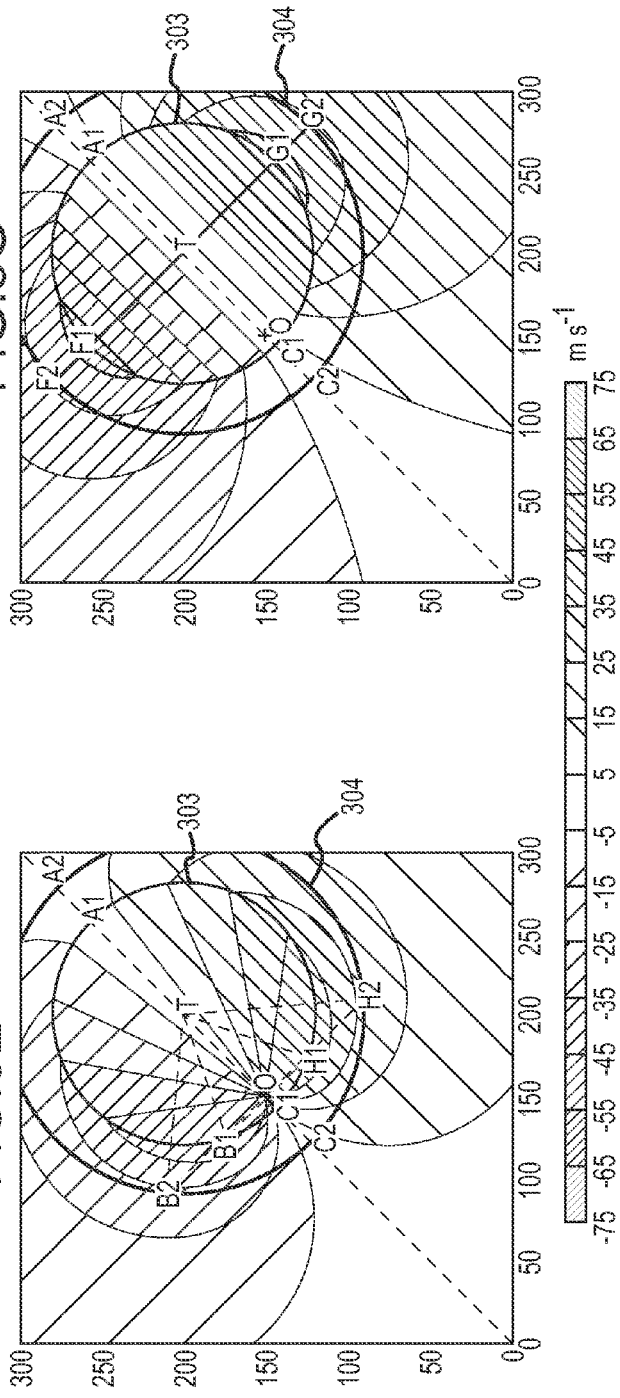
FIG. 3e shows a Doppler velocity display for a pure rotating vortex with $R_{max}$=80 km>$R_T$
Figure 3H:
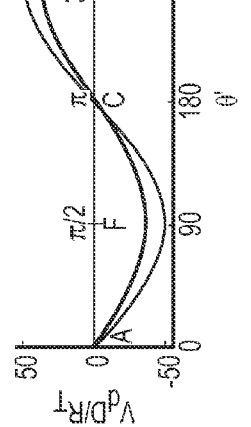
FIG. 3h shows the $V_dD/R_T$ profiles of FIG. 3g at R=80 km and R=110 km.
Figure 3F:
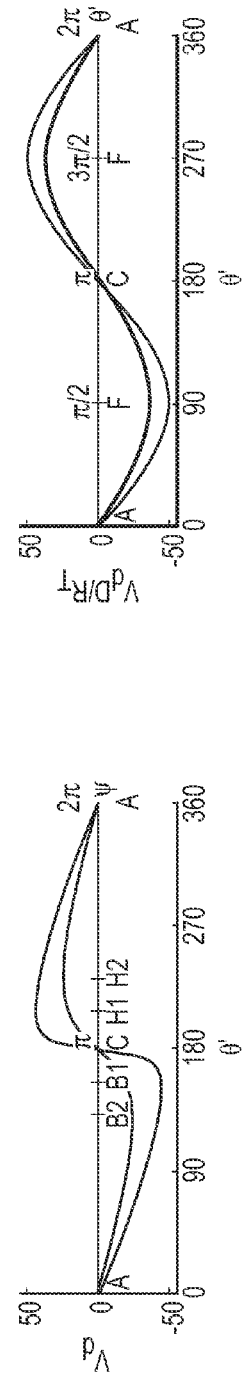
FIG. 3f shows the Doppler velocity profiles of FIG. 3e at R=80 km and R=110 km.

When the radar is inside the RMW of the larger vortex ($R_{max}=80$ km, $R_T=70.7$ km; hence $R_{max}>R_T$), the radar does not sample the full component of the $V_{Tmax}$; therefore, the peak $V_d$ around the RMW is less than the $V_{Tmax}$ (FIG. 3a). However, the corresponding $V_d D/R_T$ profile at the $R=R_{max}=80$ km, represented by 303 and R=110 km represented by 304 can recover the vortex intensity as in the $R_{max}<R_T$ case (FIG. 3c). The dipole structure can be fully recovered in the $V_d D/R_T$ space, and even if the radar does not sample the full component of $V_T$ at each radius. This property can be illustrated analytically by setting $V_R=0$, $V_M=0$, $U_1=V_T$, $U_2=0$, and $\theta_0=0$ in (22); we will then have $V_d D/R_T=V_T \sin \theta'$. There is a clear advantage to displaying atmospheric vortices in $V_d D/R_T$ space over the traditional $V_d$ space.

In summary, representing a vortex as $V_d D/R_T$ rather than $V_d$, as in the prior art approaches, simplifies the vortex signatures and eliminates the dipole distortion as a function of $R_{max}/R_T$ in the prior art $V_d$ display. In particular, the signature of a constant mean wind is a set of parallel lines. The potential to separate the vortex and the mean wind in $V_d D/R_T$ display provides a new paradigm to study the interaction between the vortex and the mean flow.

It can be shown from (22) that a new estimated center can be calculated as the midpoint of the line connecting the peak values of $V_d D/R_T$ at a given radius as long as $U_1$ and $U_2$ remain constant at the $R_{max}$ (i.e., any combination of axisymmetric $V_T$, axisymmetric $V_R$, and a constant $V_M$). The existence of axisymmetric $V_R$ and/or $V_M$ would add a constant magnitude and a constant phase shift to the sine curve at each radius that makes the dipole uneven in magnitude and rotates in azimuth. It is found that the VDAD method is especially useful for identifying the center of a near-axisymmetric vortex in a real-time operational environment. When significant asymmetric components exist, (22) is not valid and accurately estimating the center will require a more elaborate methodology, which is beyond the scope of the present invention.

In order to validate the present invention, the inventors applied the Wood and Brown (1992) method (Wood, V. T., and R. A. Brown, 1992: Effects of radar proximity on single-Doppler velocity of axisymmetric rotation and divergence. Mon. Wea. Rev., 120, 2798-2807.), to retrieve the center and $R_{max}$ where the new estimated center was calculated as (60.33 km, 60.19 km) and $R_{max}$ is 19.65 km, compared with the true center located at (60 km, 60 km) and an $R_{max}$ of 20 km. These errors are quite small (the center error is 0.38 km and the $R_{max}$ error is 0.35 km). Next, the inventors considered a more extreme case, for example, $R_{max}$ increases to 30 km, $V_{Tmax}$ decreases to 25 m s$^{-1}$, $V_M$ increases to 20 m s$^{-1}$ and the direction of $V_M$ is from the southwest, parallel to the $R_T$ vector. Then, the retrieved center was (61.45 km, 60.34 km) and $R_{max}$ is 28.77 km. The errors increase to 1.49 and 1.23 km for the center and RMW, respectively. It is clear that the errors depended both on the assigned wind fields and on the relative magnitude of the mean wind speed and direction. On the contrary, both centers estimated using the VDAD method were nearly perfect.

A series of numerical experiments (using analytical vortices) were conducted to investigate the differences between wind fields retrieved according to the present invention and GBVTD-retrieved wind fields in the presence of 1) asymmetry, 2) a misplaced center, and 3) uncertainty in the mean wind. The design of these experiments is listed in Table 1.

TABLE 1

| Test Series | Description | Parameter | GBVTD | Present Invention |
|---|---|---|---|---|
| AS0 | Wave 0 | GAS0 | MAS0 | — |
| AS1 | Wave 0 + 1 | $\theta_0 = 90°$ | GAS1 | MAS1 |
| AS2 | Wave 0 + 2 | $\theta_0 = 90°$ | GAS2 | MAS2 |
| AS3 | Wave 0 + 3 | $\theta_0 = 0°$ | GAS3 | MAS3 |
| Cx | Center displacement in the x-direction | 1-10 km | GCxN | MCxN |
| Cy | Center displacement in the y-direction | 1-10 km | GCyN | MCyN |
| VM1 | — | $\theta_T - \theta_M = -90°$ $\Delta V_M = -5\text{-}5 \text{ m s}^{-1}$ $\Delta\theta_M = -30\text{-}30°$ | — | — |
| VM2 | — | $\theta_T - \theta_M = 180°$ $\Delta V_M = -5\text{-}5 \text{ m s}^{-1}$ $\Delta\theta_M = -30\text{-}30°$ | — | VM2 |

In table 1, AS=asymmetry; C=center displacement; VM=mean wind sensitivities; G=results from GBVTD; M=results from the present invention; CxN=response to a misplaced center towards east for N km; and CyN=the response to a misplaced center toward north for N km.

In the asymmetry sensitivity test (AS series), the basic axisymmetric vortex is constructed as follows:

$$V_T = V_{T_{max}} \frac{R}{R_{max}} \text{ for } R \leq R_{max}, \text{ or} \quad (31)$$

$$V_T = V_{T_{max}} \frac{R_{max}}{R} \text{ for } R > R_{max}; \text{ and} \quad (32)$$

$$V_R = \delta_1 [(R_{max} - R)R]^{1/2} \text{ for } R \leq R_{max}, \text{ or} \quad (33)$$

$$V_R = \delta_2 (R - R_{max})^{1/2} \left(\frac{R_{max}}{R}\right) \text{ for } R > R_{max} \quad (34)$$

where $V_{Tmax}$=50 m s$^{-1}$, $R_{max}$=30 km, $\delta_1$=0.1 s$^{-1}$, and $\delta_2$=3 m s$^{-1}$, respectively.

Four experiments were conducted, including the axisymmetric vortex (AS0), and wavenumber one, two, and three asymmetries (AS1, AS2, and AS3) embedded within the axisymmetric vortex. The wavenumber being the number of maximum and minimum wind velocities detected. The asymmetric structures (wavenumbers n=1, 2, and 3) were constructed using the following equations and the parameters listed in Table 1:

$$V_T = V_{T_{max}} \frac{R}{R_{max}} \{1 + A_n \cos[n(\theta' - \theta_0)]\} \text{ for } R \leq R_{max} \quad (35)$$

$$V_T = V_{T_{max}} \frac{R_{max}}{R} \{1 + A_n \cos[n(\theta' - \theta_0)]\} \text{ for } R > R_{max} \quad (36)$$

where $A_n$=0.2. Note that we still assume that there is no asymmetric radial component in the simulated vortex.

FIG. 4 shows the analytic, GBVTD-, and present invention-retrieved wind fields for wavenumber zero (a-c), wavenumber zero plus one (d-f), wavenumber zero plus two (g-i), and wavenumber zero plus three (j-l) asymmetries. The pronounced distortions of the GBVTD-retrieved asymmetric winds (FIGS. 4b, e, h, k) are nearly nonexistent in the present invention-retrieved asymmetric winds (FIGS. 4c, f, i, l), especially in the wavenumber two and three asymmetries. The area beyond R=75 km designated 420 in the middle column is not due to zero GBVTD-retrieved winds but rather to no GBVTD estimates, because of the $R/R_T < 1$ restriction in GBVTD; thus, the advantages of present invention over GBVTD are clearly illustrated.

Figures 5A, 5B:
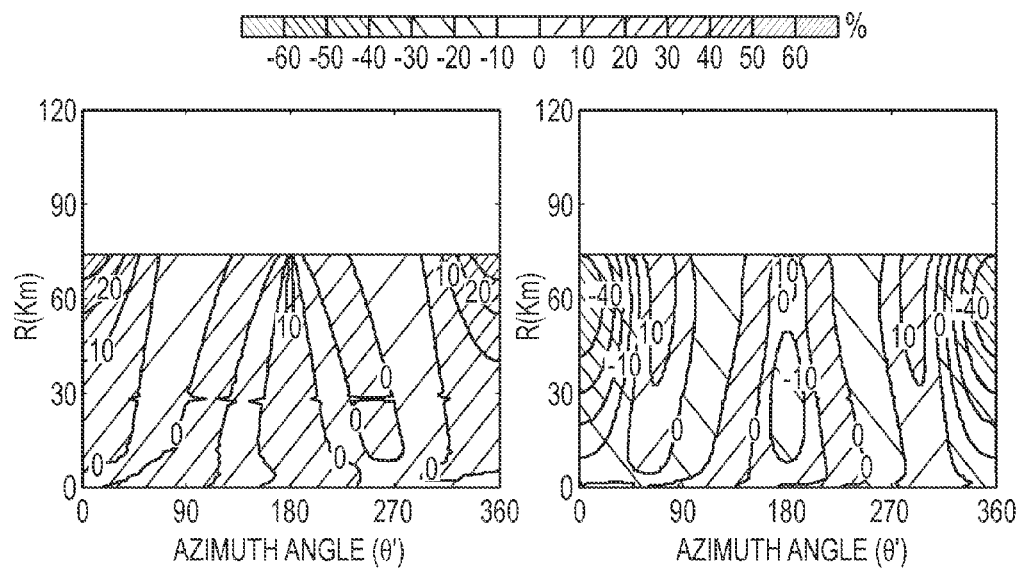
FIG. 5a-d show the percentage error distribution for the retrieved vortex of FIGS. 4h, i, k, and l.
Figures 5C, 5D:
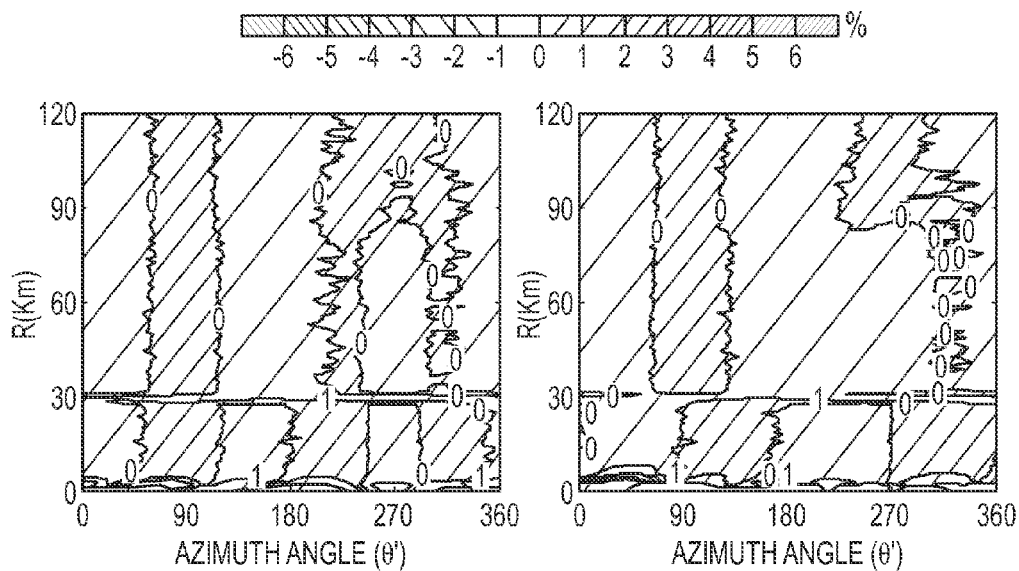

FIG. 5 shows the percentage error distribution of the retrieved wind as a function of θ' (x-axis) and R (y-axis) from wavenumber two and three asymmetries only (the errors in wavenumber zero and one cases are negligible, not shown). For GBVTD (FIG. 5(a & b), the errors are positively correlated with R and are also highly dependent on the phase of the asymmetry. In general, the wavenumber two vortex was retrieved quite well by the GBVTD technique (FIG. 4h). The worst errors (>10%) occur along the $R_T$ vector beyond R=40 km. For wavenumber three (FIG. 5b), GBVTD could not retrieve the peak wind along the $R_T$ vector beyond the center (θ=0, see FIG. 4k), while significant phase and amplitude distortions occurred at large R.

In contrast, these radius- and phase-dependent error distributions are not found in present invention (FIG. 5(c & d)) and the errors are negligible (<1%), except for regions near the center. Hence, the analysis according to an embodiment of the present invention is quite robust and nearly eliminates the geometric distortions in the retrieved asymmetric wind fields.

Figures 6E, 6F:
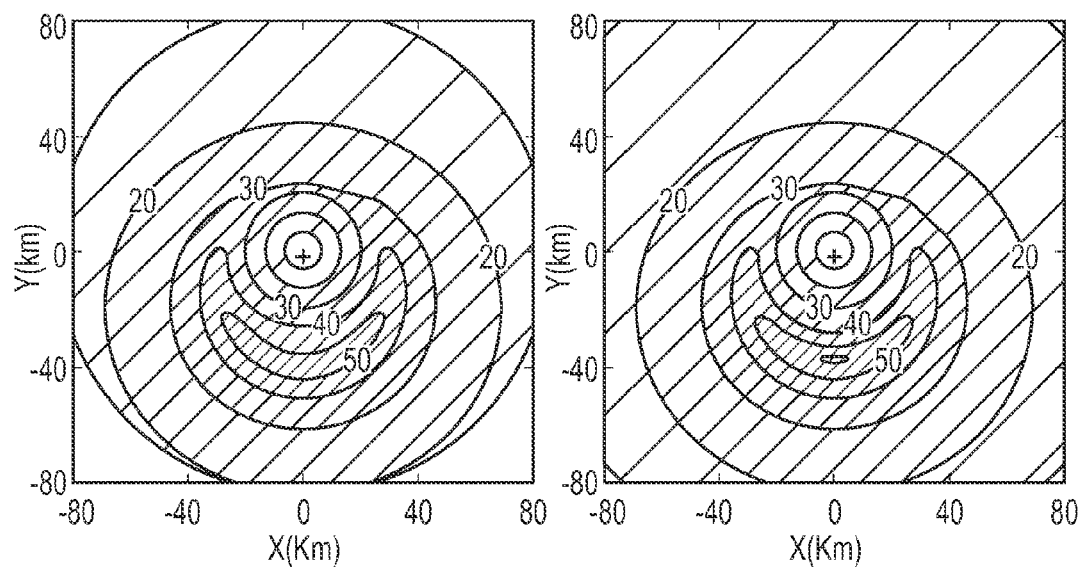
FIG. 6e shows a pure rotational vortex structure using the prior art approach for a center displacement 10 km.
FIG. 6f shows a pure rotational vortex structure using the method of the present invention for a center displacement 10 km.
Figures 8A, 8B:
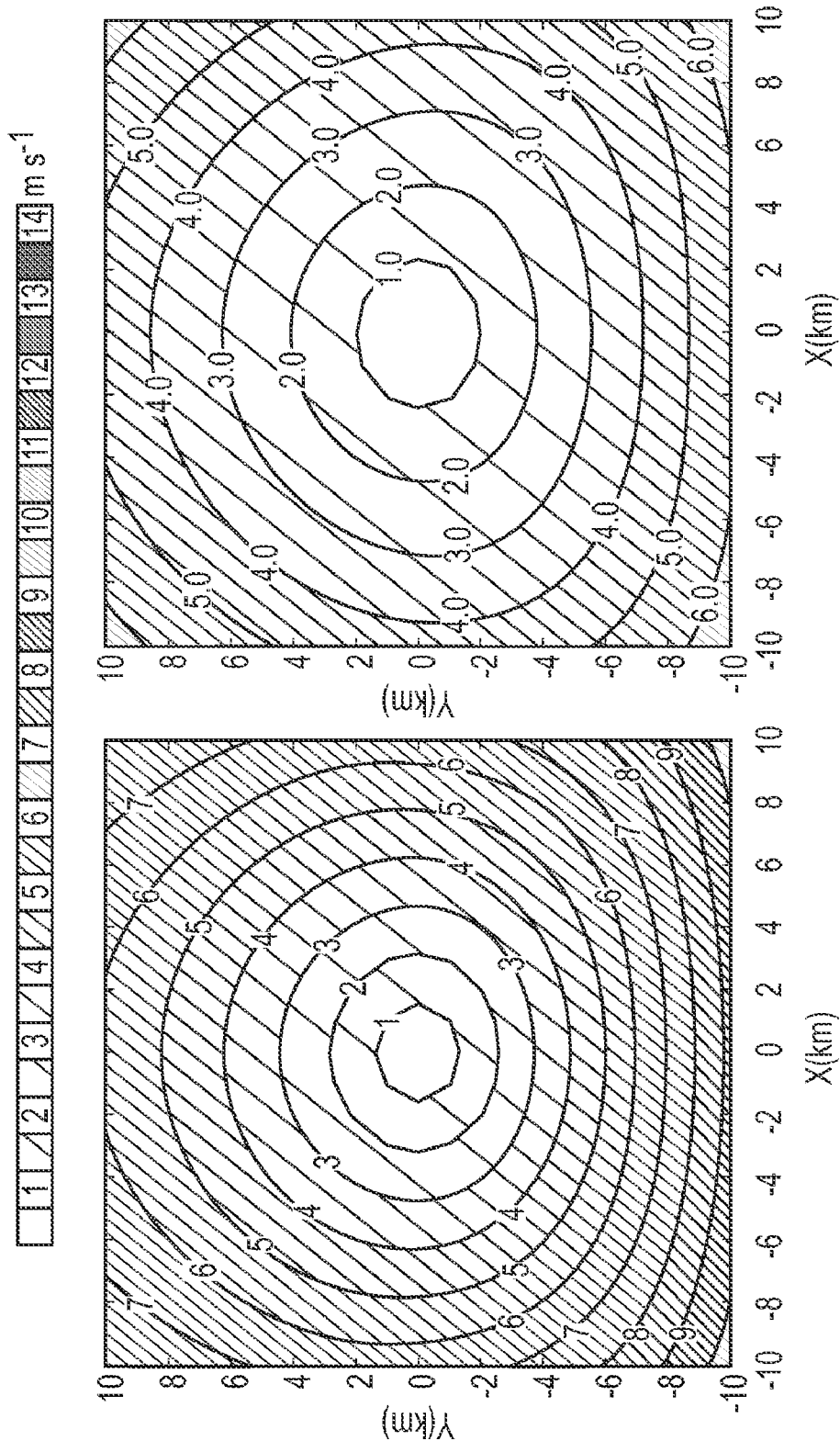
FIG. 8a shows the RMSE distributions of the retrieved $V_{Tmax}$ retrieved according to a prior art method.
FIG. 8b shows the RMSE distributions of the retrieved $V_{Tmax}$ retrieved by a method according to an embodiment of the invention.
Figures 8C, 8D:
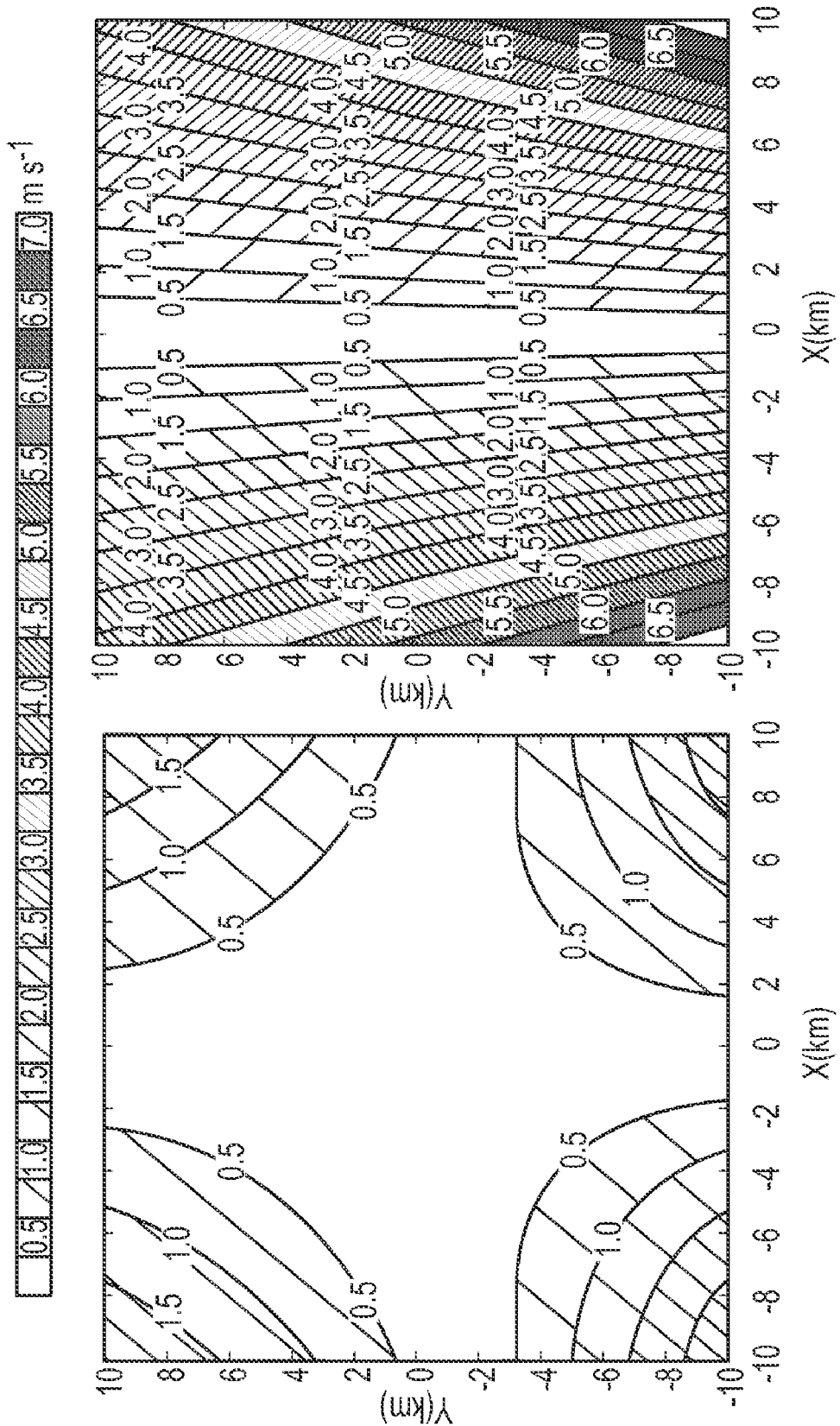
FIG. 8c shows the RMSE distributions of the retrieved $V_{Rmax}$ retrieved according to a prior art method.
FIG. 8d shows the RMSE distributions of the retrieved $V_{Rmax}$ retrieved by a method according to an embodiment of the invention.

FIGS. 6(a-f) show the GBVTD-retrieved vortex structures and the vortex structures retrieved according to an embodiment of the invention when the apparent center is displaced (a,b) 1, (c,d) 5, and (e,f) 10km, along the $R_T$ vector (y-axis) away from the center. The original vortex contains only axisymmetric $V_T$. It can be seen that both algorithms generate apparent wavenumber one components that occur in the opposite direction to the center displacement in all cases, while the amplitude increases as the center displacement increases. These errors are analogous to aliasing errors in signal processing. For a 1-km center displacement, the error is small (not shown).

FIG. 7 shows that for 5- and 10-km center displacements, however, the errors near the RMW in the GBVTD-retrieved wind fields as well as the wind fields retrieved according to an embodiment of the present invention can be as large as 50% of the analytic axisymmetric vortex (FIG. 7(c & d)). These results strongly suggest that both methods are sensitive to the center uncertainties, but with similar error characteristics. To have a reasonably correct vortex wind retrieval (e.g., less than 20% of its axisymmetric tangential component), the uncertainty in the center cannot exceed approximately 5 km. Once the vortex is established around a first center approximation, the new estimated center can be determined as discussed above by the midpoint of the line connecting the peak $V_dD/R_T$ values.

To examine further, the root-meansquare error (RMSE) of the GBVTD- and present invention-retrieved $V_{Tmax}$ and $V_{Rmax}$ for various center displacements can be calculated. It can be seen that the RMSE of the retrieved $V_{Tmax}$ as a function of center displacement in the x and y directions (FIG. 8(a & b)) is quasi-linearly proportional to the magnitude of the misplaced centers. The error in the $V_{Tmax}$ retrieved according to an embodiment of the present invention is about 40% less than the GBVTD-retrieved $V_{Tmax}$. A 2-km center displacement produces about a 3% error (1.5 m s$^{-1}$ error for $V_{Tmax}$, =50 m s$^{-1}$) in GBVTD and a 2% error in the present invention. The errors are symmetric when the center is displaced perpendicular to the $R_T$ vector. When the center is misplaced along the $R_T$ vector, the errors are larger (smaller) around the near (far) side of the center. The error distributions of $V_{Rmax}$ are very different between the two methods (FIG. 8(*c* & *d*)). The $V_{Rmax}$ errors in GBVTD are more symmetric to the center while the $V_{Rmax}$ errors in present invention are more sensitive to the center displacement perpendicular to the $R_T$ vector. In a typical situation where the misplaced center is ~2 km both methods perform very well.

Figures 9A, 9B:
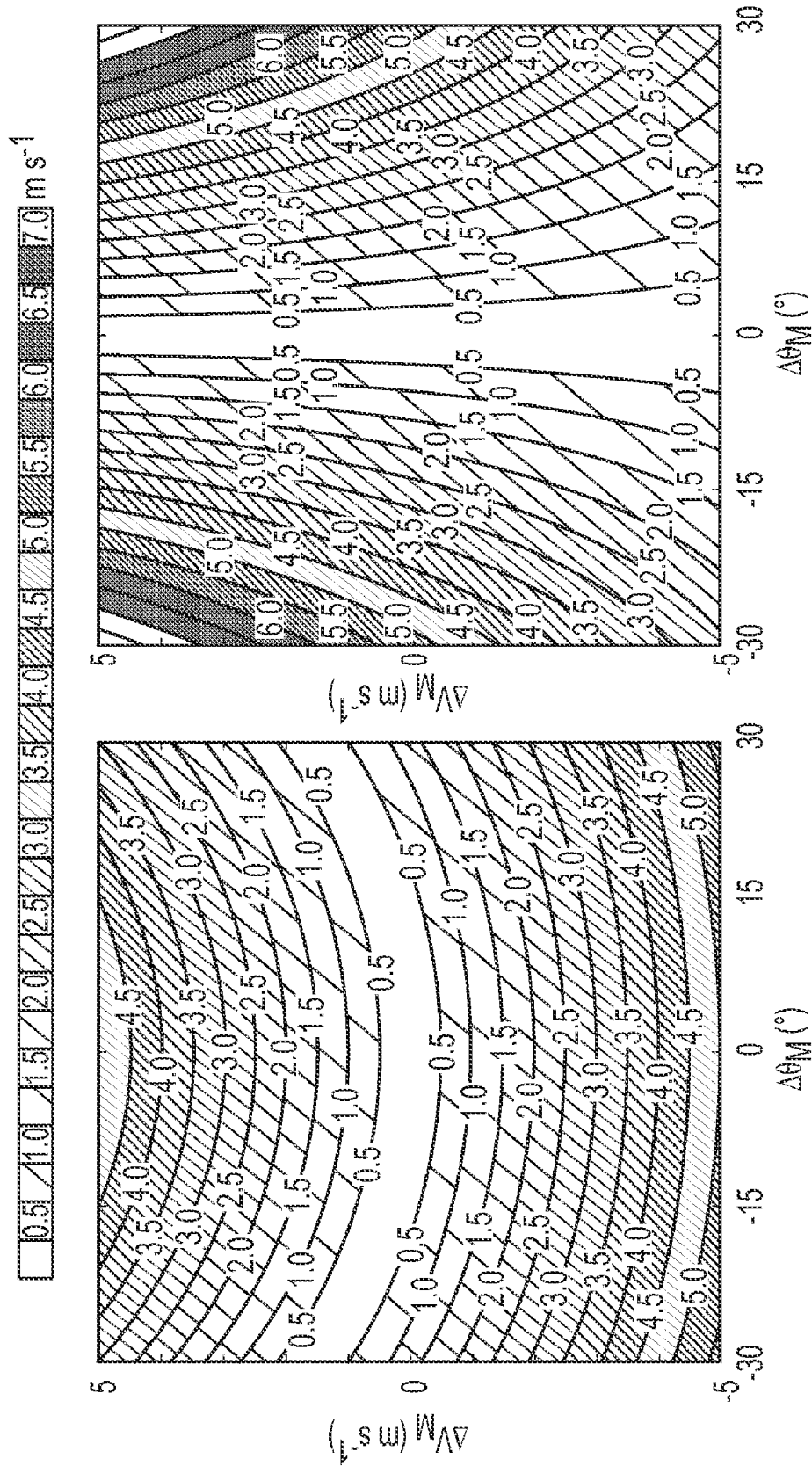
FIG. 9a shows the effect of mean wind on the $V_{Tmax}$ retrieved according to a prior art approach.
FIG. 9b shows the effect of mean wind on the $V_{Rmax}$ retrieved according to a prior art approach.

FIG. 9 shows the sensitivity of the axisymmetric vortex retrieved according to the present invention on the uncertainty of the mean wind in the direction perpendicular to the $R_T$ vector. The error distributions are quite different between the retrieved $V_{Tmax}$ and $V_{Rmax}$. It is clear that the retrieved $V_{Tmax}$ is sensitive to the error in the mean wind speed. A 50% error in the mean wind speed results in ~10% error in the retrieved $V_{Tmax}$. The error of $V_{Tmax}$ increases proportionally as the assigned error in the mean wind speed. However, the error of $V_{Rmax}$ is more sensitive to the mean wind direction instead. The situation is reversed while the mean wind direction is along the $R_T$ vector (VM2 test, not shown); the retrieved $V_{Tmax}$ is more sensitive to the mean wind direction and the retrieved $V_{Rmax}$ is more sensitive to the mean wind speed.

Typhoon Gladys (1994) was used to gain understanding of the mean wind and vortex signatures in the $V_d D/R_T$ display according to an embodiment of the invention. It should be appreciated that any TC could have been chosen and the use of Typhoon Gladys should not limit the scope of the present invention. According to the Joint Typhoon Warning Center (JTWC), Gladys was a relatively small typhoon with moderate intensity. The $V_d$ constant-altitude PPI (CAPPI) display of Gladys at 4-km height (FIG. 10*a*) shows that Gladys' inner-core diameter is about 35 km, indicated by the circle 1001 in the lower-right-hand corner of the display. The approaching Doppler velocity exceeded 50 m s$^{-1}$ and the receding component was about 15 m s$^{-1}$. This pronounced asymmetric structure indicates a possible combination of a strong mean flow and/or an asymmetric vortex. FIG. 10*b* shows the corresponding $V_d D/R_T$ display according to an embodiment of the invention. It is clear that the vortex circulation was mostly confined to lower-right corner of the display, where the near-parallel straight lines aligned in a north-south direction to the left of the radar (opposite side of the center) suggested a likely east-west-oriented mean wind at this level.

Figure 10D:
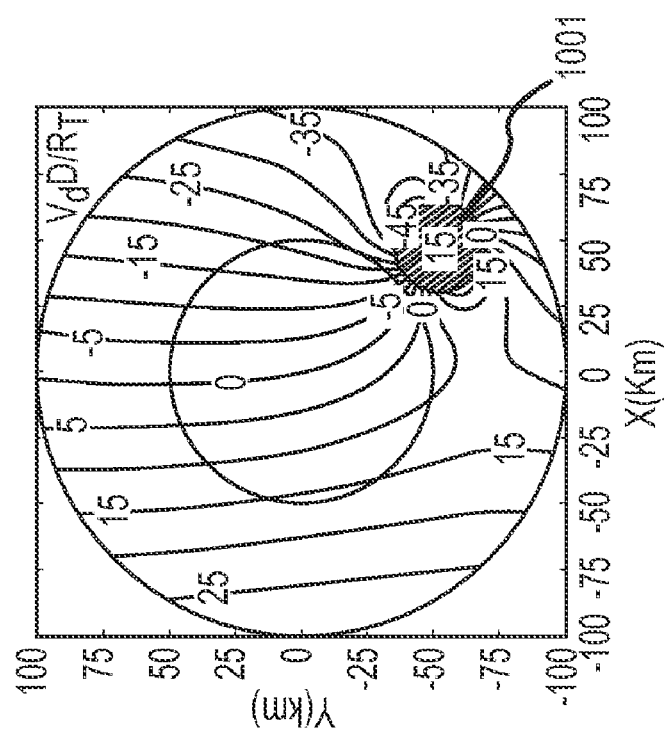
FIG. 10d shows the simulated $V_dD/R_T$ velocity of Typhoon Gladys.
Figure 10C:
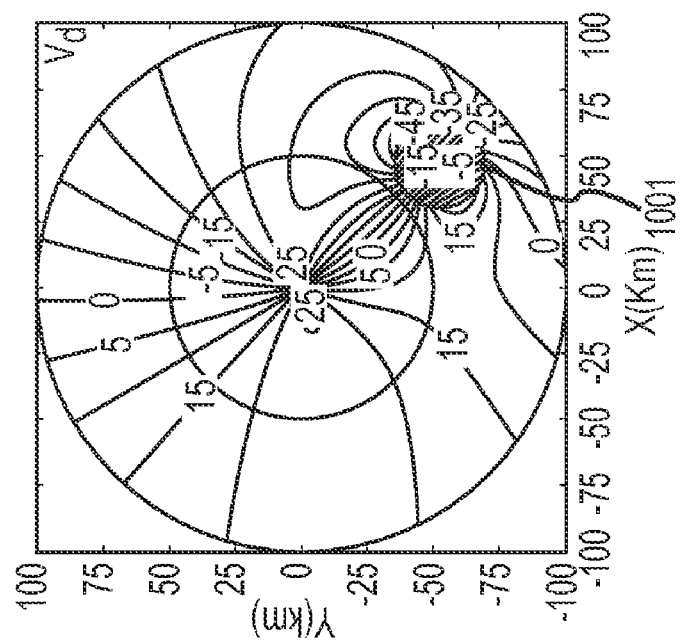
FIG. 10c shows the simulated Doppler velocity of Typhoon Gladys.

The flow field of a Gladys-sized Rankine vortex with a RMW of 16.5 km and $V_{Tmax}$ of 35 m s$^{-1}$ embedded in a 20 m s$^{-1}$ easterly mean wind was simulated, and the corresponding $V_d$ and $V_d D/R_T$ displays are shown in FIG. 10(*c* & *d*). Even with no asymmetric $V_T$ and $V_R$ in the simulation, the similarity between the observed and simulated $V_d$ (FIG. 10(*a* & *c*)) and $V_d D/R_T$ (FIG. 10(*b* & *d*)) is very encouraging. With the $V_d D/R_T$ display, the gross features of the vortex and its accompanied mean flow characteristics can be estimated with a reasonable accuracy, while the mean wind is not straightforward enough for identification in the $V_d$ display (FIG. 10*a*). Note that an east-west-oriented convective line ~70 km north of the radar forces the $V_d D/R_T$ contours to be oriented in the east-west direction in FIG. 10*b* instead of north-south, as in FIG. 10*d*. Differences in the actual and simulated $V_d D/R_T$ are also apparent in the rain-bands northeast of the radar where asymmetric vortex components are likely.

The present invention introduces a technique for generating and displaying atmospheric vortices with a new variable $V_d D/R_T$. It is evident that the $V_d D/R_T$ display simplifies the vortex interpretation and eliminates the geometric distortion of the dipole signature displayed in $V_d$. It is shown that the present invention is a more general form for the VTD family of techniques. The present invention provides a number of advantages over the GBVTD technique. The invention creates negligible geometric distortion. The $V_d D/R_T$ variable relates the vortex circulation in a linear coordinate system. Hence, the pronounced distortion of retrieved asymmetric winds in GBVTD has been nearly eliminated, especially when high-wavenumber asymmetries are involved and/or $R/R_T$~1. According to an embodiment of the invention, the analysis domain can be expanded compared to the GBVTD method. In GBVTD, the analysis domain is limited by $R/R_T$<1, where the distortion of the retrieved wind fields worsens as $R/R_T$ approaches unity. In the present invention, the analysis can be extended to cover the entire domain of the Doppler radar whenever there are enough data for meaningful analysis, as portrayed in FIG. 4. The ability to recover the dipole structure for $R>R_T$ is particularly striking. This characteristic is especially important for assimilating retrieved winds into a numerical model in the future. Another advantage of the present invention compared to the GBVTD method is that it is relatively straightforward. The subjective estimation of the mean wind is from the $V_d D/R_T$ display when the vortex circulation is not dominating the Doppler velocities. In this situation, a constant mean wind appears as parallel lines and can be easily recognized subjectively. The possibility to separate the vortex signature from the mean wind signature provides a useful tool for studying the vortex mean flow interactions in the future.

When estimating the center location and RMW in the $V_d D/R_T$ space, the VDAD method has advantages over prior art approaches in the $V_d$ space, especially for a near-axisymmetric vortex. The VDAD method is particularly useful in an operational environment for quick determination of the gross features of the vortex.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other atmospheric vortex kinematic structures, and not just to the embodiments described above and shown in the accompanying figures. Accordingly, the scope of the invention should be determined from the following claims.

We claim:

1. A method for generating a representation of a kinematic structure of an atmospheric vortex, comprising the steps of:
   receiving a plurality of signals from a Doppler radar, the signals being reflected at a plurality of pulse volumes;
   measuring a plurality of Doppler velocities based on the received signals;
   calculating a plurality of scaled Doppler velocity values representing:
      the plurality of measured Doppler velocities,
      the radial distance between the Doppler radar and the pulse volume where the Doppler velocity is measured, and
      the distance between the radar and a first estimated atmospheric vortex center; and generating a representation of the kinematic structure of the atmospheric vortex using the plurality of scaled Doppler wind velocity values.

2. The method of claim 1, further comprising the step of calculating a second estimated atmospheric vortex center based on the intersection of a line connecting two points where the measured Doppler wind velocity is approximately zero and a line connecting two measured maximum scaled Doppler wind velocities.

3. The method of claim 1, wherein the plurality of pulse volumes comprise a plurality of locations around one or more circles having different radii around the first estimated atmospheric vortex center.

4. The method of claim 2, further comprising the step of locating a radius of maximum wind at a pulse volume having a maximum calculated scaled Doppler velocity.

5. The method of claim 1, further comprising the step of calculating a mean wind vector based on the gradient of the measured Doppler velocity and the radial distance between the Doppler radar and a pulse volume where the Doppler velocity is measured.

6. The method of claim 1, wherein the scaled Doppler velocity values compensates for a distortion in the measured Doppler velocities as the atmospheric vortex approaches the Doppler radar.

7. The method of claim 1, further comprising the step of generating a display of the representation of the kinematic structure of the atmospheric vortex using the plurality of scaled Doppler wind velocity values.

8. A method for calculating a center of an atmospheric vortex, comprising the steps of:
  receiving a plurality of signals from a Doppler radar, the signals being reflected at a plurality of pulse volumes;
  measuring a plurality of Doppler velocities based on the received signals;
  calculating a plurality of scaled Doppler velocity values representing:
    the plurality of measured Doppler velocities,
    the radial distance between the Doppler radar and the pulse volume where the Doppler velocity is measured, and
    the distance between the radar and a first estimated atmospheric vortex center; and
  calculating the center of the atmospheric vortex as the intersection of a line connecting two points where the measured Doppler velocity is substantially equal to zero and a line connecting two measured maximum scaled Doppler velocities.

9. The method of claim 8, wherein the plurality of pulse volumes comprise a plurality of locations around one or more circles having different radii around the first estimated atmospheric vortex center.

10. The method of claim 9, further comprising the step of locating a radius of maximum wind at a pulse volume having a maximum calculated scaled Doppler velocity.

11. The method of claim 8, further comprising the step of calculating a mean wind vector based on a gradient of the measured Doppler velocity and the radial distance between the Doppler radar and the pulse volume where the Doppler velocity is measured.

12. The method of claim 8, wherein the scaled Doppler velocity compensates for a distortion in the measured Doppler velocity as the atmospheric vortex approaches the Doppler radar.

13. The method of claim 8, further comprising the step of generating a display of the calculated center of the atmospheric vortex.

* * * * *